(12) United States Patent
Shiba

(10) Patent No.: US 7,467,000 B2
(45) Date of Patent: Dec. 16, 2008

(54) HINGE DEVICE OF PORTABLE EQUIPMENT AND PORTABLE TELEPHONE

(75) Inventor: Tsuyoshi Shiba, Kanagawa (JP)

(73) Assignee: Katoh Electric Machinery Co., Ltd., Kanagawa (JP)

(*) Notice: Subject to any disclaimer, the term of this patent is extended or adjusted under 35 U.S.C. 154(b) by 382 days.

(21) Appl. No.: 11/297,946

(22) Filed: Dec. 1, 2005

(65) Prior Publication Data
US 2006/0123593 A1 Jun. 15, 2006

(30) Foreign Application Priority Data
Dec. 13, 2004 (JP) ............................. 2004-360463

(51) Int. Cl.
*H04M 1/00* (2006.01)
(52) U.S. Cl. .............. 455/575.8; 455/575.1; 455/575.3; 455/575.4; 455/550.1
(58) Field of Classification Search ........................ None
See application file for complete search history.

(56) References Cited

U.S. PATENT DOCUMENTS
2005/0066474 A1* 3/2005 Hsu et al. ...................... 16/330

FOREIGN PATENT DOCUMENTS
JP 2004-138092 5/2004

* cited by examiner

*Primary Examiner*—Duc Nguyen
*Assistant Examiner*—Dai A Phuong
(74) *Attorney, Agent, or Firm*—Notaro & Michalos P.C.

(57) ABSTRACT

A hinge device of portable equipment and telephones uses fewer parts, facilitating an assembly and reducing the costs while enabling complex operations. The device includes a first portion for rotably connecting a first case body and a second case body constituting a portable telephone, with each other around a first hinge pin, and a second portion for rotably connecting the hinge pin perpendicular to the first hinge pin. The second portion includes the second hinge pin and a second cam mechanism with biasing assembly that controls rotation of the hinge body. The first portion includes a hinge case body the first hinge pin, and a first cam mechanism with biasing assembly that controls rotation of the hinge body. At least one of the first and second cam mechanisms includes a double-sided cam having a double-sided cam portion.

6 Claims, 13 Drawing Sheets

(a)

(b)

(c)

(d)

(a)

(b)

HINGE DEVICE OF PORTABLE EQUIPMENT AND PORTABLE TELEPHONE

BACKGROUND OF THE INVENTION

1. Field of the Invention

The present invention relates to a hinge device of portable equipment, suitable for use in opening and closing a first and a second case body in the direction in which either of said case bodies separates from the other, or in rotating the same along the surfaces of the both, and to a portable telephone provided with said hinge device.

2. Description of the Related Art

Among portable telephones which belong to portable equipment, the foldable ones are marketed, and such foldable portable telephones have a first case body as with a keyboard portion and a microphone portion mounted on the top surface thereof on one hand, and on the other, a second case body with a display portion and a speaker portion and rotatably connect by means of hinge device either of the case bodies to each other. In the above-mentioned foldable portable telephones a second case body is rotatably connected through a hinge device with the rear portion of the top surface, thus realizing a closure of a transmitter portion by allowing the second case body to overlap a transmitter portion on the top surface of the first case body: in other words, since the transmitter portion is closed in a condition in which the first case body overlaps the second, the user may make use of the portable phone thereof available by rotating the second case body with regard to the first in order to expose the transmitter portion (i.e. separate the transmitter portion from the second case body), with one hand grasping the first case body, while the other grasping the second.

In the recent years, among portable telephones, those with various functions as those incorporating a use of communication lines such as internet are found in the market. Such portable telephones, cannot fulfill their functions, since the angle of first case body with regard to the second would be limited as far as they have a structure for rotating the first and the second case body only for the purpose of closure and exposure of the transmitter portion. Therefore one kind of portable telephones is proposed, wherein, in addition to the rotation of a first case body, for closure and exposure of transmitter portion, in a direction in which the first case body is disengaged from a second, may be rotated in a horizontal direction (thus realizing a rotation along the surfaces of the first case body and second case body with one of the surfaces of either one body being contacted with the other). A document thereof, Japanese Laid-Open No. 2004-138092, is known to the public.

A hinge device described in this Patent Document 1 is configured, wherein a first case body is connected with a second so as to be rotatable around a first hinge pin which extends in a direction parallel to the cross direction of a first case body, a first case body being connected with a second so as to be horizontally rotatable around a second hinge pin which extends in a direction perpendicular to the first hinge pin, so that either of the first and second case body may rotate around two rotation axes in a direction different from the other. However, such hinge device is not provided with functions holding a first case body to be locked at a position relative to a second, allowing each of a first and second case body to easily rotate through two rotation axes. Consequently, where e.g. the user makes a call on the telephone or uses communication lines such as internet, it may be sometimes difficult to talk to the phone or see the display, because of the position of the first and second case body to be easily out of an appropriate alignment. Accordingly a use of an engagement convex portion and engagement concave portion being engaged by operating a pin using a biasing force of a spring is proposed, for the purpose of keeping the first and second case body locked to each other at a predetermined position while each of the case bodies can rotate through second hinge pin; in such case however, because of an increased number of parts mounted, a mounting would be complicated and the costs are increased. Furthermore, another proposed device is characterized by an engagement convex portion and engagement concave portion being engaged in order to keep locked to each other at a predetermined position the first and second case body while each shall rotate through first hinge pin; in such case, two members would be necessitated, one with an engagement protrusion portion and another with engagement concave portion, and thus these two members keep case bodies locked at one position. As a result, in order that a first and second case bodies may be kept locked, at three different positions, a closing position on one hand, in which a transmitter portion on the top surface of a first case body is closely contacted with a second case body, and on the other two opening positions which both allow the user to use such portable telephone by exposing a transmitter portion, six members in total shall be necessitated since an engagement convex portion and an engagement concave portion should be separately engaged at each of the above positions, requiring again an increased number of parts, a complicated mounting, and increased costs. Moreover, conventional portable telephones would necessitate complicated settings, in order to include complex operations and characteristics by means of hinge device.

SUMMARY OF THE INVENTION

The present invention has been developed to solve the above problem and its object is to provide a hinge device of portable equipment and portable telephone using the same for decreasing the number of parts, facilitating an assembly, and thus reducing the costs; all the more enabling more complex operations and characteristics.

To achieve the above object, an hinge device of portable equipment and portable telephone according to the present invention is characterized by including a first hinge pin and coupling a first case body and a second case body constituting the portable equipment to each other so as to allow the second case body to rotate relative to the first case body with respect to the first hinge pin; a second hinge portion including a second hinge pin which extends in a direction perpendicular to the first hinge pin and coupling the first case body and the second case body to each other so as to allow the second case body to rotate relative to the first case body with respect to the second hinge pin; in said hinge device said second hinge portion comprises: the second hinge pin standing vertically on the first case body; a hinge body provided to be rotatable around an axis of the second hinge pin; and a second cam mechanism on which a biasing means controls the rotation of the hinge body acts; further in the above hinge device said first hinge portion comprises: a hinge case body having a rotation arresting means on an outer periphery thereof to be fixed to the hinge body; the first hinge pin rotatably provided in an axial direction in a central portion of the hinge case body; and a first cam mechanism on which a biasing means controls the first hinge pin, and; in said hinge device the second case body is attached to said first hinge portion so as to make a gap between the second case body and the first case body and to be rotatable via the first hinge portion even when the second case body is in a 0° to 180° rotation range by said second hinge portion, and at least one of the first cam mechanism and the second cam mechanism includes a double-sided cam having a double-sided cam portion.

According to the present invention, due to a rotation of a hinge body around a second hinge pin, a second case body is maintained to be locked at a predetermined position with regard to a first case body using a second cam mechanism. Further, where a first hinge pin rotates with regard to a hinge case body, the second case body is maintained to be locked at a predetermined position with regard to the first. A double-sided cam is used having a double-sided cam portions on either one of the above first cam mechanism or second cam mechanism.

Further to achieve the above object, the present invention provides a hinge device of a portable equipment including: a first hinge portion including a first hinge pin and coupling a first case body and a second case body constituting the portable equipment to each other so as to allow the second case body to rotate relative to the first case body with respect to the first hinge pin; a second hinge portion including a second hinge pin which extends in a direction perpendicular to the first hinge pin and coupling the first case body and the second case body to each other so as to allow the second case body to rotate relative to the first case body with respect to the second hinge pin; further in said hinge device, said second hinge portion comprises: the second hinge pin standing vertically on the first case body; a hinge body provided to be rotatable around an axis of the second hinge pin; a second cam A fixed to a fore end portion of the second hinge pin; a second cam B rotating together with the hinge body as well as being movable in an axial direction of the second hinge pin, and being in surface contact with the second cam A; a second biasing means, provided between the second cam B and the hinge body, for biasing the second cam B toward the second cam A; a second cam convex portion provided on at least one of a contact surface of the second cam A and a contact surface of the second cam B; and a second cam concave portion provided on at least the other of the contact surface of the second cam A and the contact surface of the second cam B and engaged with the second cam convex portion to keep a position of the second case body relative to the first case body at a predetermined position in a locked state; in the said mechanism said first hinge portion comprises: a hinge case body fixed to the hinge body; the first hinge pin rotatably supported by the hinge case body; a first cam A fixed to the first hinge pin and having a mounting part to which the second case body is attached; a double-sided cam engaged with the hinge case body as well as being movable in an axial direction of the first hinge pin, and being in surface contact with the first cam A; a first cam B rotating together with the first hinge pin as well as being movable in the axial direction of the first hinge pin, and being in surface contact with the double-sided cam; a first biasing means, provided between the first cam B and the hinge case body, for biasing the first cam B toward the double-sided cam to thereby press the double-sided cam against the first cam A; first cam convex portions provided on at least one of a contact surface of the first cam A and a first contact surface of the double-sided cam being in contact with the first cam A and on at least one of a second contact surface of the double-sided cam being in contact with the first cam B and a contact surface of the first cam B; and first cam concave portions provided on at least the other of the contact surface of the first cam A and the first contact surface of the double-sided cam and on at least the other of the second contact surface of the double-sided cam and the contact surface of the first cam B, and engaged with the first cam convex portions to keep a position of the second case body relative to the first case body at a predetermined position in a locked state.

Furthermore, to achieve the above object, the present invention provides the hinge device of the portable equipment, in which the second cam convex portions are arranged on at least one of the contact surface of the second cam A and the contact surface of the second cam B at 90° intervals in a circumferential direction thereof, and the second cam concave portions are arranged on at least the other of the contact surface of the second cam A and the contact surface of the second cam B at 90° intervals in the circumferential direction thereof.

In addition, to achieve the above object, the present invention provides the hinge device of the portable equipment, in which the second cam A and the second cam B are formed in a disc shape, and the second biasing means is constituted of two springs or more arranged in a circumferential direction of the second cam B.

Moreover, to achieve the above object, the present invention provides the hinge device of the portable equipment, in which a said second hinge portion includes a rotation restricting means for restricting a rotation range of the hinge body relative to the second hinge pin.

The present invention, to achieve the above object, provides the hinge device of the portable equipment; the characteristic of the hinge device is that first in that device, the single first cam convex portion is provided on the contact surface of the first cam A, the two first cam concave portions engaged with the first cam convex portion are provided on the first contact surface of the double-sided cam, and the first cam convex portion and the first cam concave portions are engaged with each other when the first case body and the second case body are in a closed state where the first case body and the second case body are put one on the other and a first rotation angle of the second case body relative to the first case body is 0°, as well as being engaged with each other when the second case body in the closed state is rotated relative to the first case body with respect to the first hinge pin up to the first rotation angle of 150°, and second, further in that device, the single cam convex portion is provided on the second contact surface of the double-sided cam, the two first cam convex portions engaged with the first cam convex portion are provided on the contact surface of the first cam B, and the first cam convex portion and the first cam concave portions are engaged with each other when the first case body and the second case body are in the closed state where the first case body and the second case body are put one on the other and the first rotation angle of the second case body relative to the first case body is 0°, as well as being engaged with each other when the second case body in the closed state is rotated relative to the first case body with respect to the first hinge pin up to the first rotation angle of 180°.

The present invention, to achieve the above object, provides a portable telephone comprising the hinge device of the portable equipment.

DETAILED DESCRIPTION OF THE PREFERRED EMBODIMENT(S)

Hereinafter, a hinge device of the portable equipment and portable telephone according to the present invention will be described based on the accompanying drawings.

Figure 1:
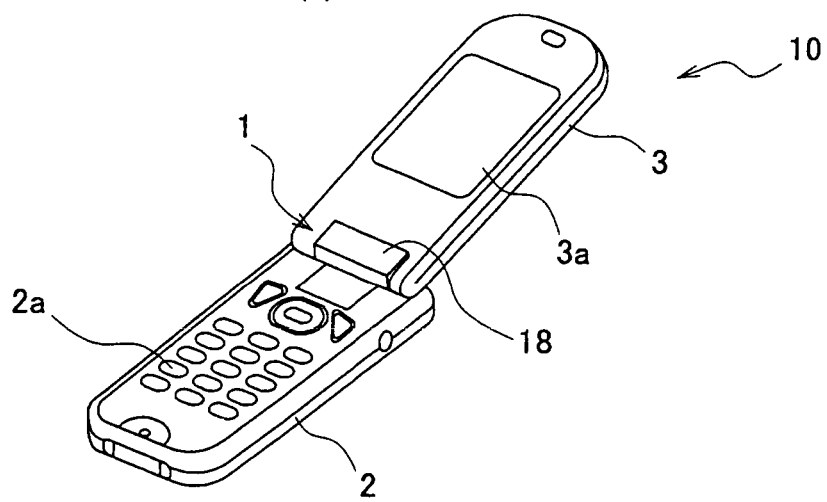
FIG. 1A to 1D show an embodiment of a portable telephone according to the present invention, FIG. 1A being a perspective view for illustrating a state in which a second case body is opened, FIG. 1B and FIG. 1C being a perspective and a side view and both illustrating a state in which a second case body is closed, and FIG. 1D being a perspective view for illustrating a state in which a second case body is rotated through a second hinge pin.
Figure 1:
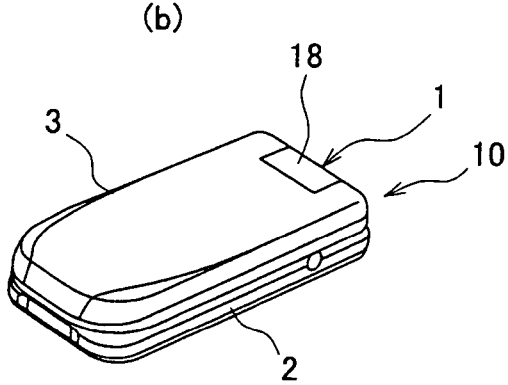
Figure 1:
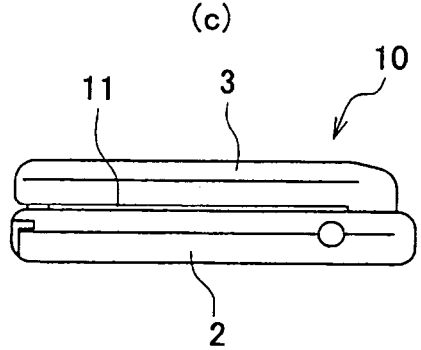
Figure 1:
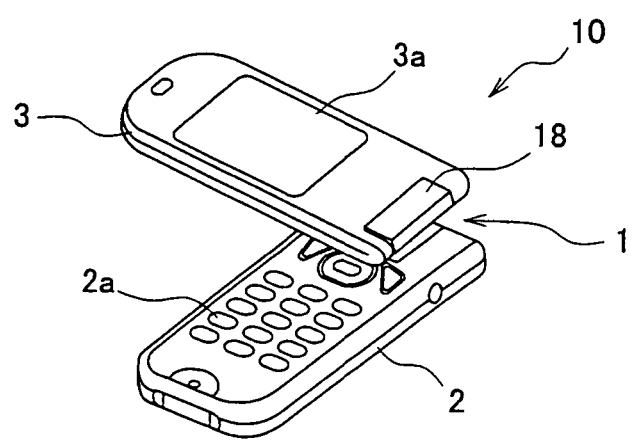

FIG. 1 shows an embodiment of a portable telephone according to the present invention, while in FIGS. 2 to 5 embodiments of a hinge device of a portable equipment according to the present invention are illustrated. A hinge device of a portable equipment according to the present invention includes a first hinge portion 4 rotatably connecting through a first hinge pin a first case body 2 and a second case body 3 which are constituent parts of the portable equipment, and a second hinge portion 5 rotatably connecting a first case body 2 and a second case body 3 which are constituent parts of the portable equipment, through a second hinge pin which extends in a direction perpendicular to the first. Portable equipment is not particularly limited, but e.g. portable telephones, portable information terminals such as ZauruS™, electric calculators, portable video game machines can be used, portable telephones being the most preferable. Furthermore, the following embodiments illustrate a portable telephone 10 as portable equipment, which nevertheless are not limited to a telephone.

A first case body 2 constitutes a transmitter portion of the portable telephone 10, and includes a keyboard portion 2a and microphone portion, etc. on the top surface thereof. The first case body 2 is formed in a long and substantially rectangular shape, a second case body 3 on the other hand, functions as a receiver portion, having a display portion 3a such as LCD, a speaker portion and a camera portion. The second case body 3 is formed in a long and substantially rectangular shape which is substantially the same as the one of the first. A first case body 2 and a second case body 3 are connected with each other, allowing the rotation of the both case bodies through hinge device 1 and thus constituting a portable telephone 10. In the portable telephone 10 the transmitter portion is closed, where the top surface of a first case body 2 overlaps the lower surface of a second case body 3, and on the other hand, the transmitter portion is exposed, where the top surface of a first case body 2 and the lower surface of a second case body 3 is disengaged with each other. Moreover, in the above-mentioned portable telephone 10, the first case body 2 is connected with the second case body 3, so that the first case body 2 can rotate through the first hinge pin until 180° from the position in which a first case body 2 overlaps a second case body 3. Further, while the first case body 2 overlaps the second case body 3 (see especially FIG. 1C), a gap 11 is produced between the first case body 2 and the second case body 3, and the second case body 3 is connected with the first case body 2 so as to rotate through the second hinge pin e.g. until 180° with regard to the first case body 2. In the meanwhile, a mention to 180° in the present invention implies degrees about 180°.

A hinge device 1 of portable equipment according to the present invention is characterized by a structure in which a first hinge portion 4 includes a first cam mechanism 6 for keeping the second case body 3 locked at a predetermined position with regard to the first case body 2 and a second hinge portion 5 includes a second cam mechanism 7 for keeping the second case body 3 locked at a predetermined position with regard to the first case body 2. The hinge device 1, mounted close to the rear portion of top surface of the first case body 2, rotatably connects the first case body 2 with the second case body 3, being covered with an exterior cover 18.

A second hinge portion 5 supports the second case body 3 so as to be rotatable with regard to the first case body 2 through a second hinge pin which extends in a direction perpendicular (or substantially perpendicular) to the cross direction. The second hinge portion 5 is not particularly limited only if such can support the second case body 3 in a manner that the latter is rotatable with regard to the first case body 2, is provided e.g. with a second hinge pin 51 which is mounted on the first case body 2, a hinge body 52 rotatably mounted around the second hinge pin 51, and a second cam mechanism 7.

Figure 2:
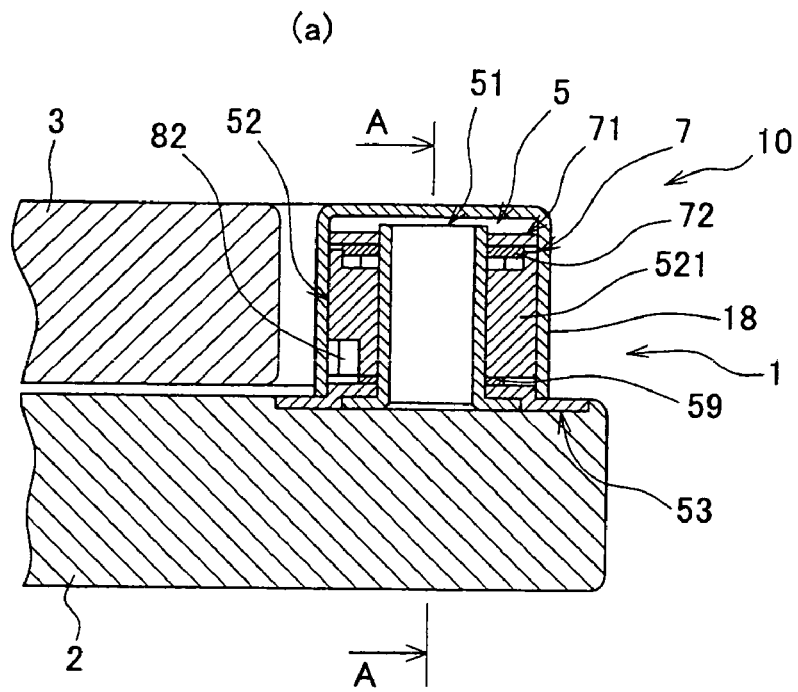
FIGS. 2A and 2B are sectional views showing an embodiment of a hinge device of a portable equipment according to the present invention, FIG. 2A being a side sectional view, FIG. 2B being an A-A arrow sectional view of 2A.
Figure 2:
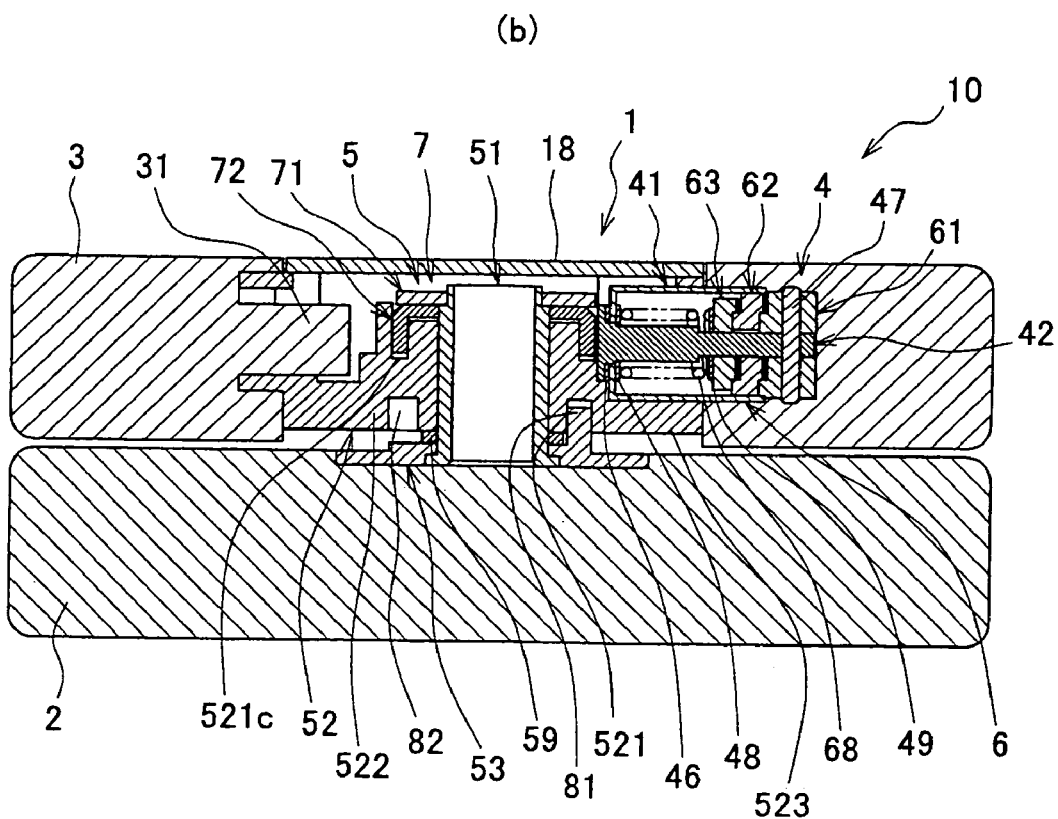
Figure 3:
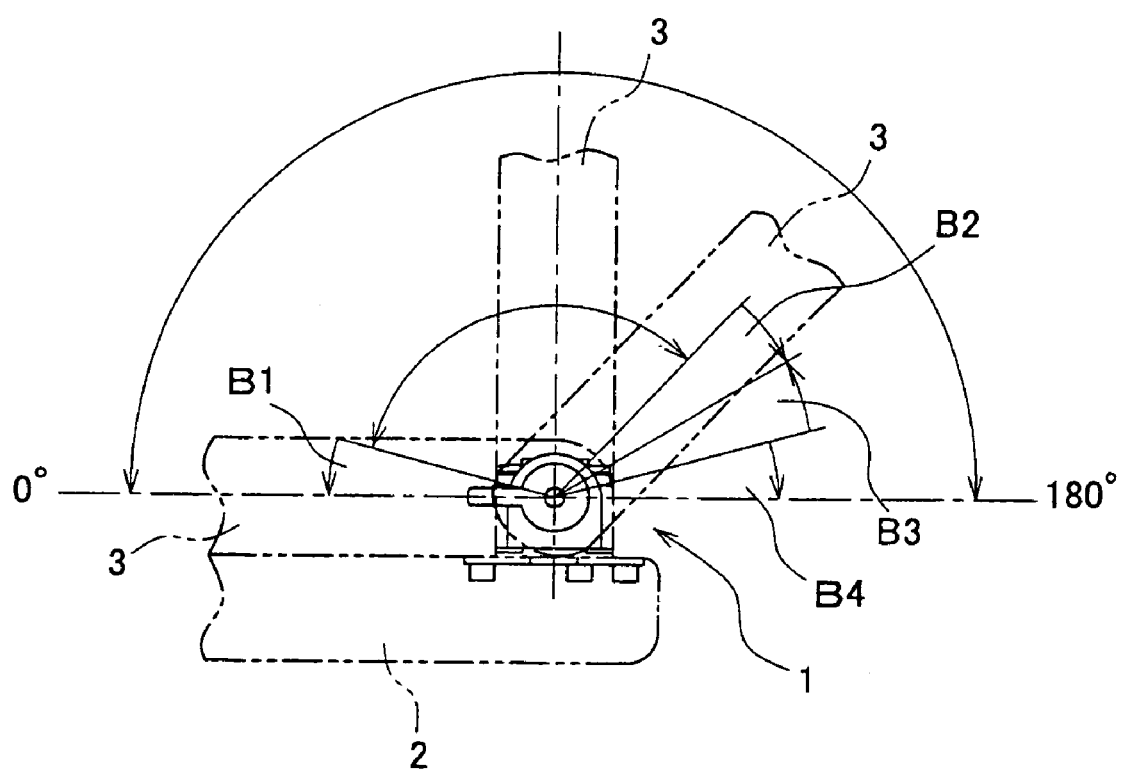
FIG. 3 is a perspective view showing an embodiment of a hinge device of a portable equipment according to the present invention.
Figure 5:
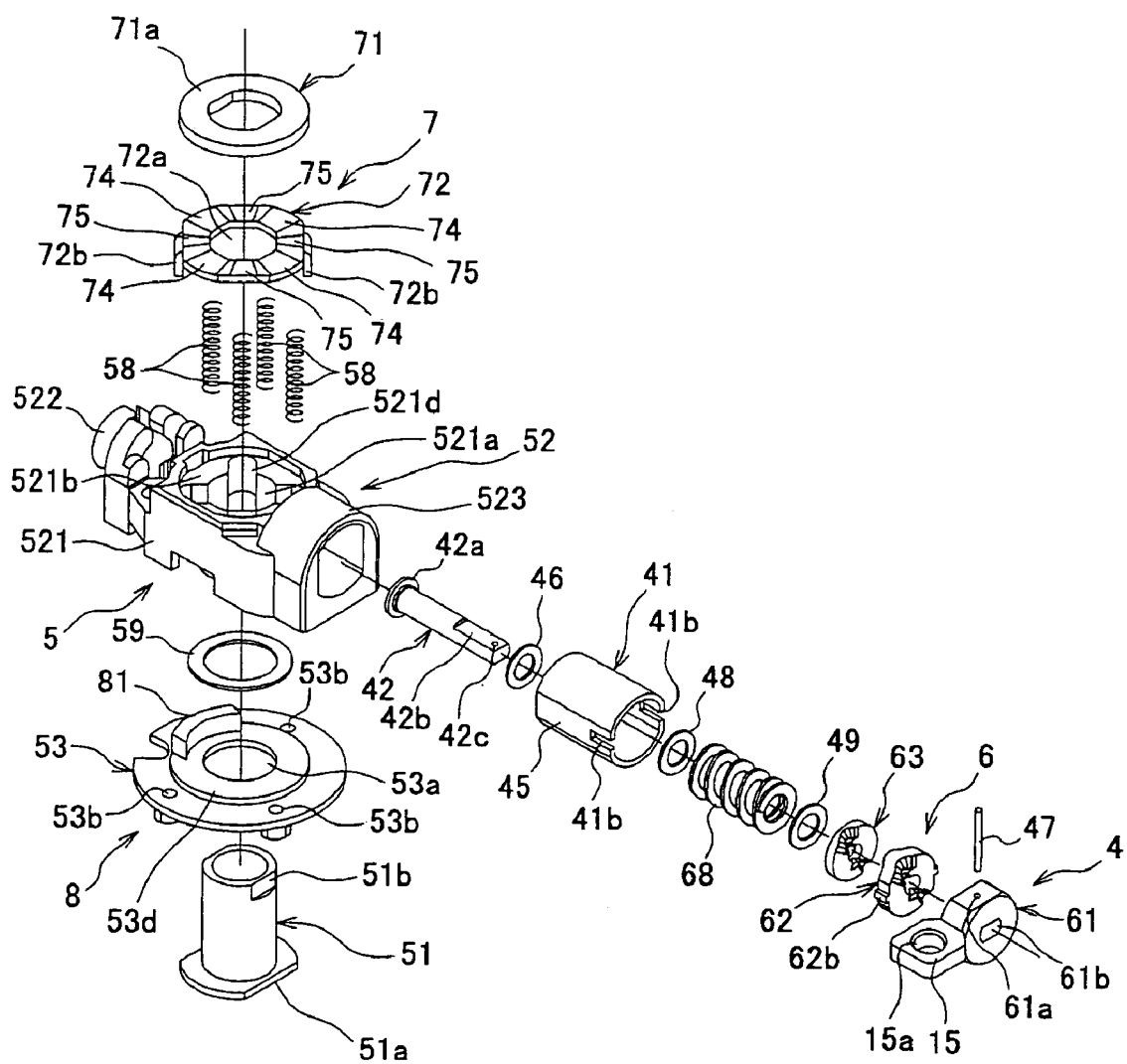
FIG. 5 is a exploded perspective view showing an embodiment of a first and a second hinge portion according to the present invention, omitting an exterior cover thereof.
Figure 6:
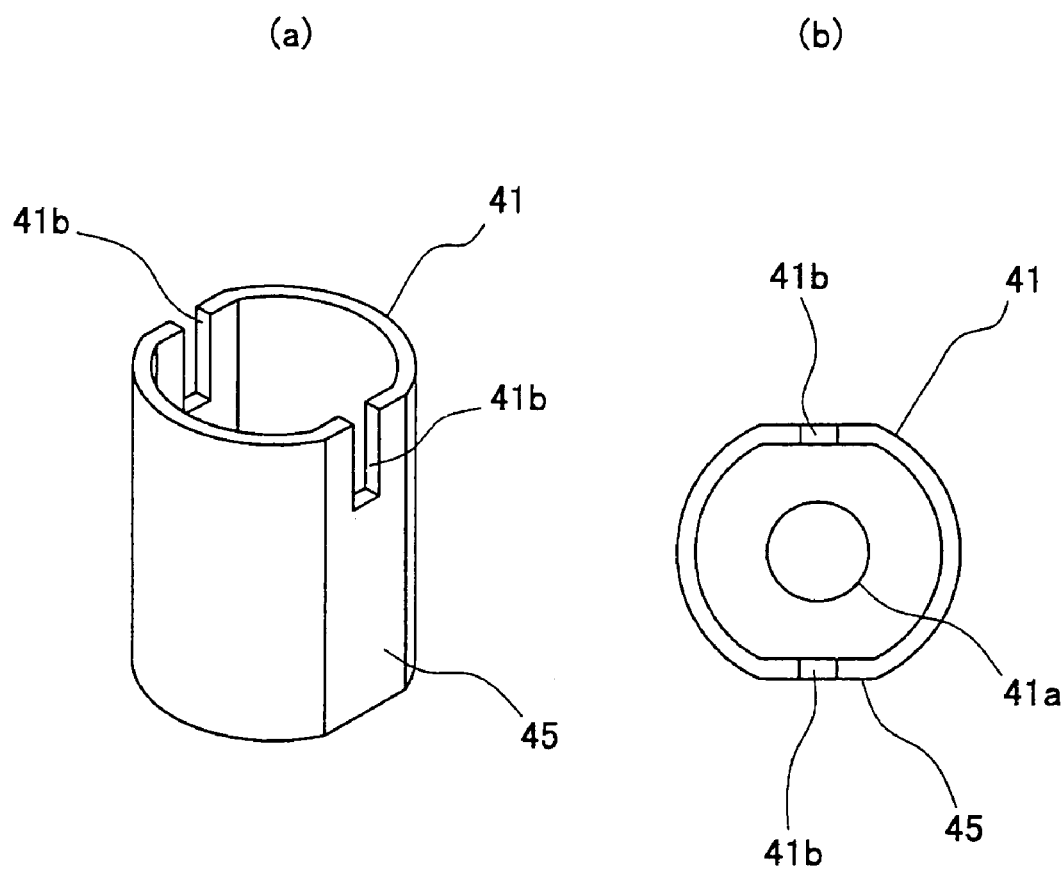
FIGS. 6A and 6B show an embodiment of a case body according to the present invention, FIG. 6A being a perspective view, and FIG. 6B being a plain view.
Figure 7:
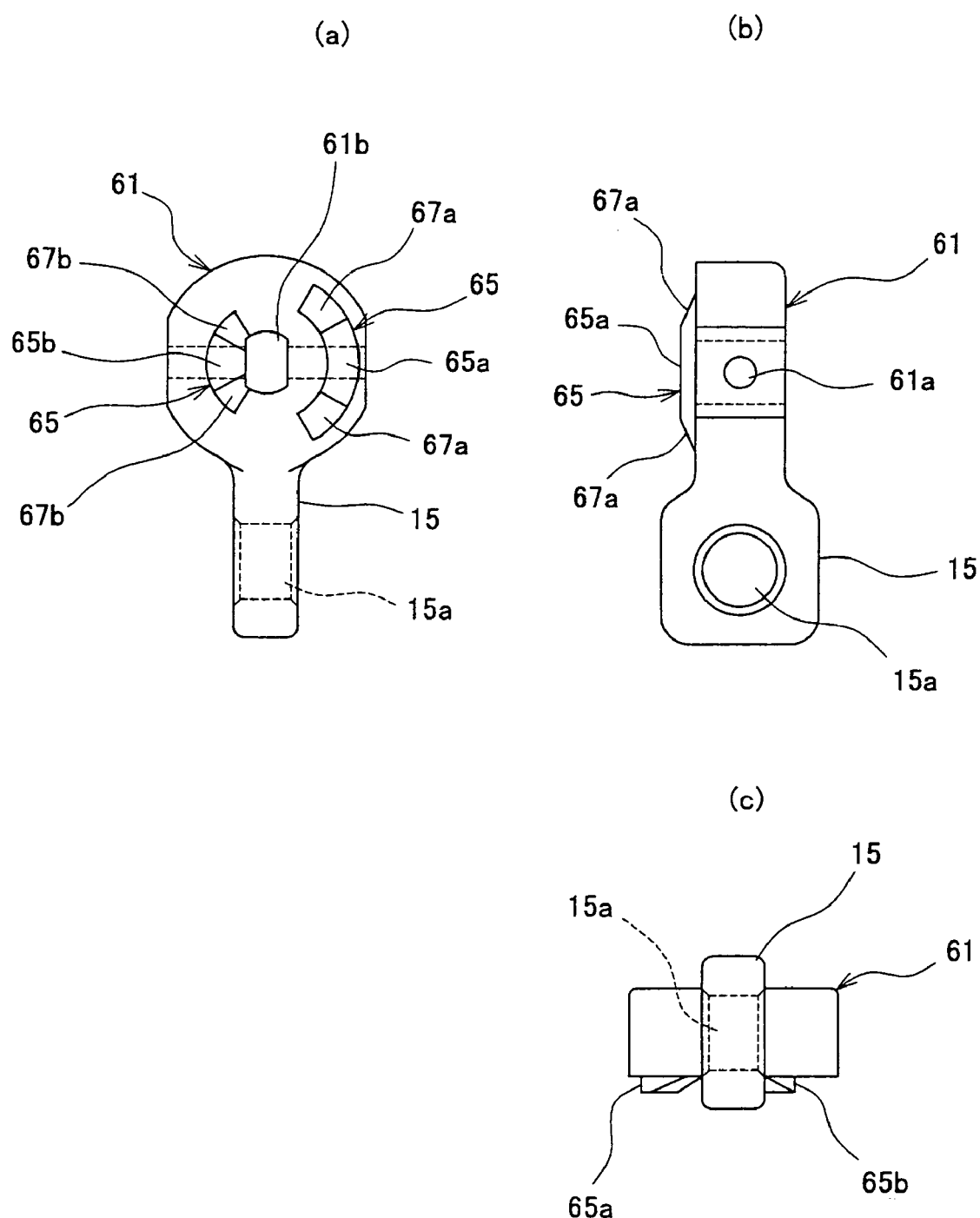
FIG. 7A to 7C are views showing an embodiment of a first cam A according to the present invention, FIG. 7A being a perspective view, and FIG. 7B being a side view and FIG. 7C being a bottom view.

A second hinge pin 51 is mounted on the first case body 2 so as to protrude in a direction perpendicular to the surface thereof, e.g. by means of a base member 53; a flange portion 51a is mounted on one end of the second hinge pin 51, as shown in FIGS. 2 and 5. The flange portion 51a is formed e.g. in the substantially elliptical shape which has notches parallel to each other at circumferential surfaces with a form of a circle having a diameter larger than the one of the second hinge pin 51. The circumferential surface of the other end (which may be called fore end portion) constitutes an insertion convex portion 51b substantially elliptical with each of the portions of circumferential surfaces axially notched to be parallel to each other.

Figure 13:
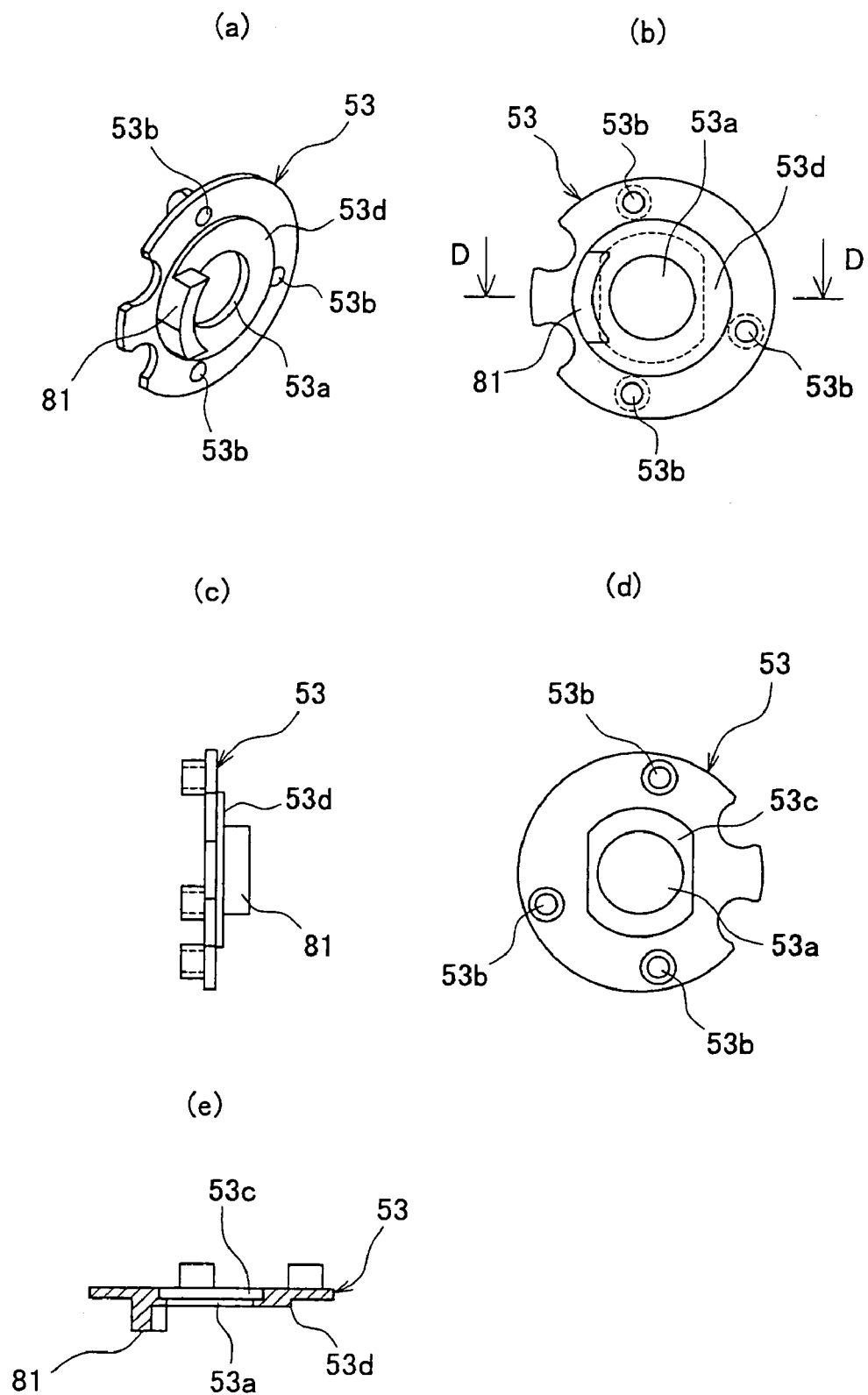
FIG. 13A to 13E are views showing an embodiment of a base member according to the present invention, FIG. 13A being a perspective view and FIG. 13B being a plan view, FIG. 13C being a side view, FIG. 13D being a back view, and FIG. 13E being a D-D arrow sectional view of 13B.

A base member 53, as shown in FIGS. 2, 5 and 13, has a substantially disc form, with an insertion hole 53a into which a second hinge pin 51 is inserted coaxially thereof. On the base member 53, one or two or more, e.g. three mounting holes are provided, and with the mounting holes the base member 53 is mounted on the surface of the first case body 2, and a second hinge pin 51 is inserted and flange portions 51a thereof are pinched between the base member 53 and the surface of the first case body 2. A flange insertion concave portion 53c, which is mounted on the rear surface (with which a flange portion 51a is contacted) of the base member 53 and into which flange portion 51a is inserted, is attached to a first case body 2 without being rotatable. On the surface of the base member 53 a circular level difference 53d is provided, and on such a circular level difference the side of an insertion hole is at a higher level and the side of an outer rim portion is at a lower level. A restriction convex portion 81 in the shape of a circular arc is mounted on one portion of the level difference 53d.

Figure 10:
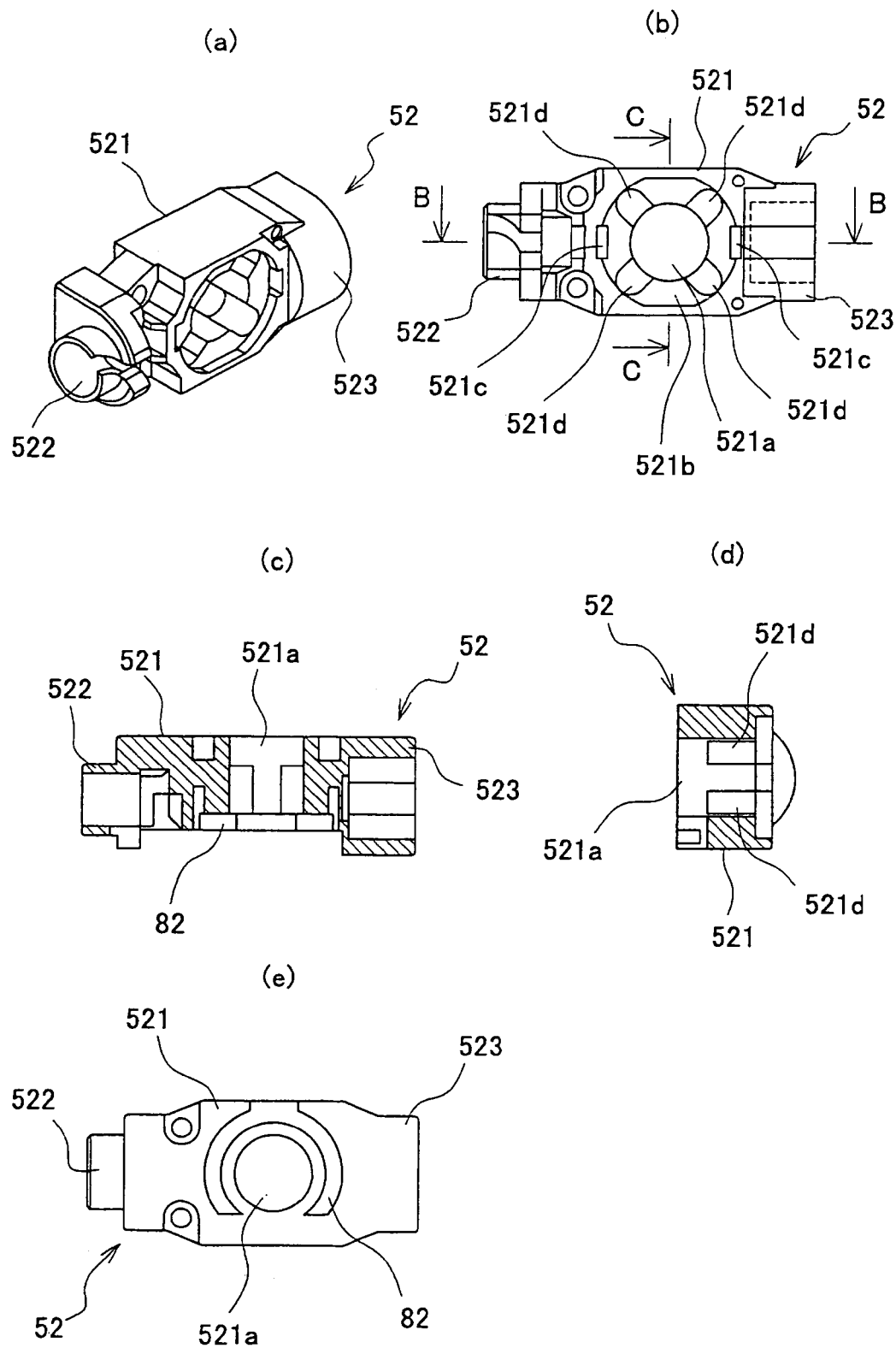
FIG. 10A to 10E are views showing an embodiment of a hinge body according to the present invention, FIG. 10A being a perspective view and FIG. 10B being a plan view, FIG. 10C being a B-B arrow sectional view of 10B, FIG. 10D being a C-C arrow sectional view of 10B, and FIG. 10E being a back view.
Figure 11:
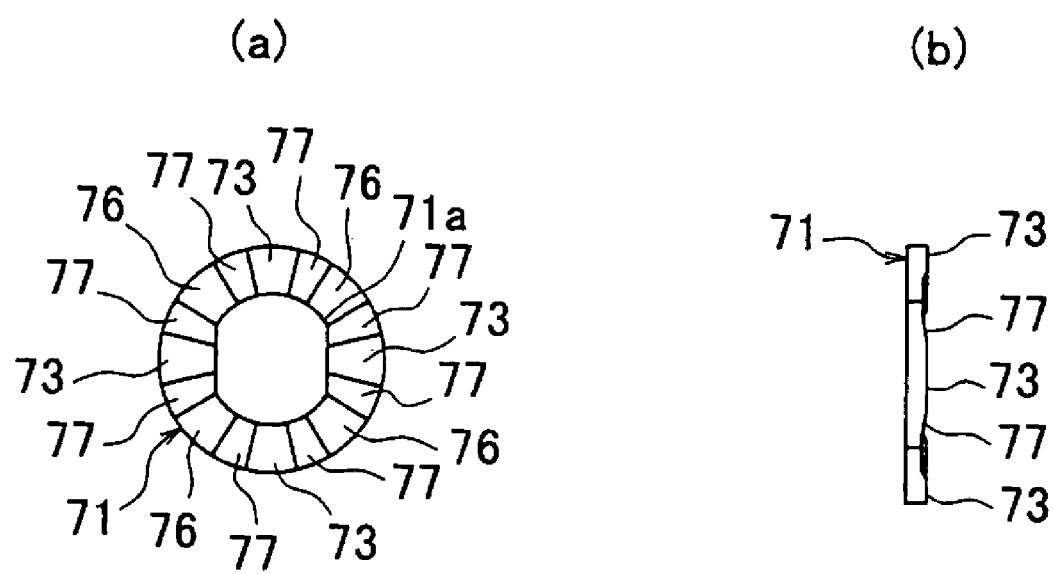
FIGS. 11A and 11B are views showing an embodiment of a second cam B according to the present invention, FIG. 11A being a plan view and FIG. 11B being a side view.
Figure 12:
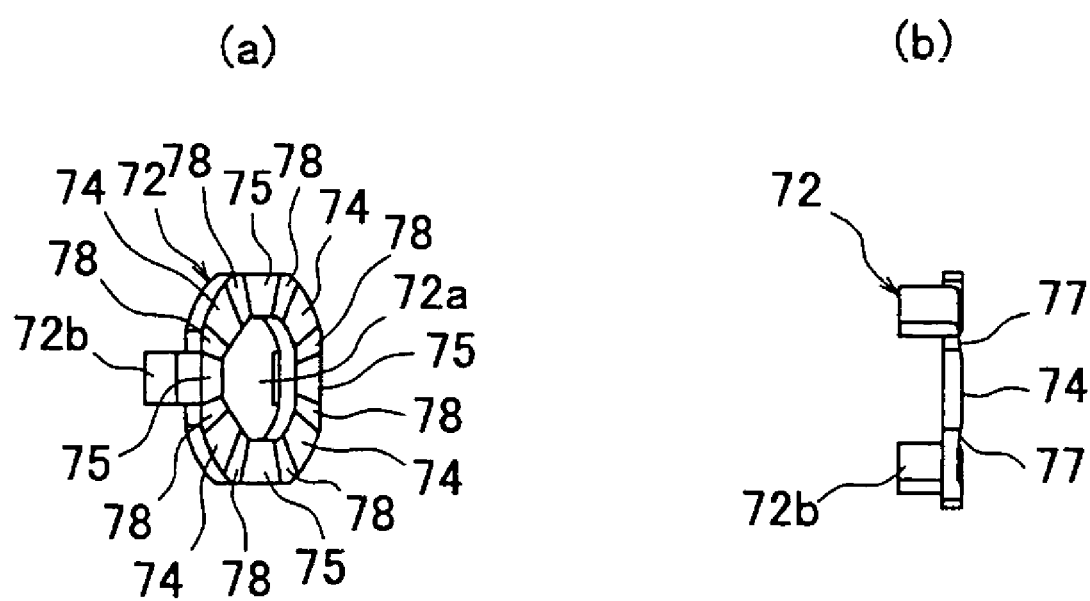
FIGS. 12A and 12B are views showing an embodiment of a second cam B according to the present invention, FIG. 11A being a perspective view and FIG. 11B being a side view.

As shown in FIGS. 2, 5 and 10, a hinge body 52 is composed of a main body 521 thereof and a holder into which a second case body 3 is attached. A body's main body 521 is formed in a substantially rectangular box-shape. On the body's main body 521 a penetration hole 521a is mounted, a hole penetrating from the central portion of the lower surface to the central portion of the top surface of the main body 521a. The penetration hole 521a, through which a second hinge pin 51 is inserted, rotatably supports a hinge body 52. It is preferable that the penetration hole 521a would have a larger diameter than a second hinge pin 51, e.g. slightly larger diameter than the latter is also acceptable.

Two holders are mounted on any two of four lateral surfaces opposed to each other on the body's main body 521. The two holders have a substantially cylindrical form; one holder is coaxial of another, and each one has an opening in a direction opposite to another.

Either one of the holders (it may be called first holder 522) is formed in a substantially cylindrical shape. The form inside a first holder 522 is substantially circular. A cylindrical rotation portion 31 of a second case body 3 is attached to the first holder 522. The other holder (it may be called second holder 523) has a substantially cylindrical shape. The form inside a second holder 523 is substantially elliptical, with parallel portions notched off a circle. A first hinge portion 4 is attached to the second holder 523.

Figure 4:
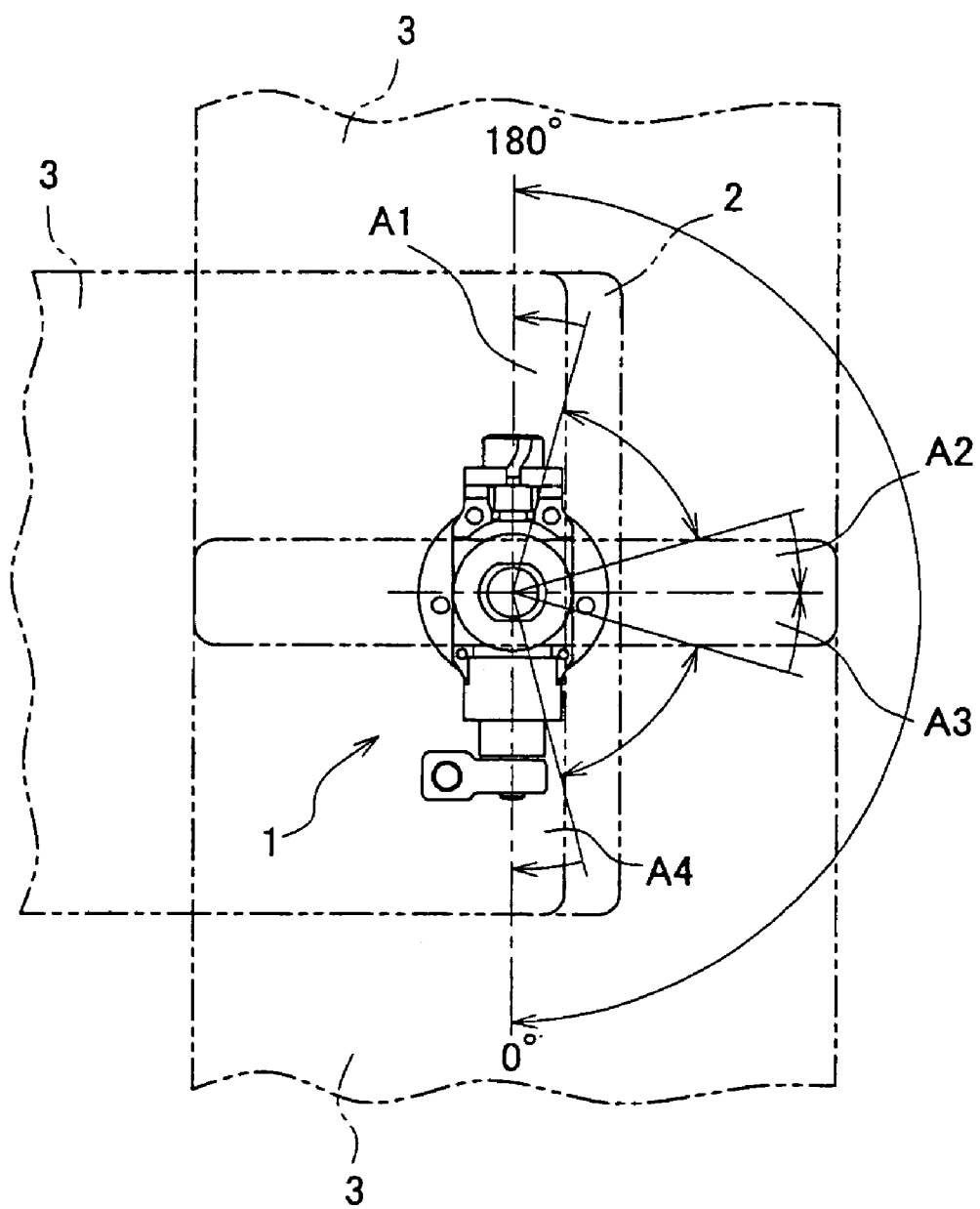
FIG. 4 is a plan view showing an embodiment of a hinge device of a portable equipment according to the present invention, omitting an exterior cover thereof.

A restriction concave portion 82 is mounted on the lower surface of body's main body 521, wherein a restriction convex portion 81 is mounted for restricting the rotation range of a hinge body 52. A restriction concave portion 82 is formed in the shape of a circular arc which is coaxial (allowed also to be substantially coaxial) of a penetration hole 521a. The restriction concave portion 82 (circumferential surface) is preferable to be formed with a length, within which a restriction concave portion 81 may rotate 180°. The restriction concave portion 82 and a restriction concave portion 81 are preferably configured so that a hinge body 52, which is attached to so as be rotatable through a second hinge pin 51 by means of a washer 59 and to have the cross direction of a first case body 2 parallel (also substantially parallel) to axes of a first and second holders 522 and 523, may rotate 180° to either one direction, e.g. to the left in FIG. 1D: it is desirable that a second case body 3 is connected with at 0° a first case body 2 SO as to be at 0° with regard to the latter, having an axis of a second hinge pin 51 as shown in FIG. 4, while the cross direction of the former is parallel to the cross direction of the latter. The restriction concave portion 82 and a restriction concave portion 81 constitute a restriction means 8, which is not limited to the restriction concave portion 82 and a restriction concave portion 81, only if the means can restrict a rotation of a hinge body 52, but may be of other structure. In the meanwhile, a reference to 0° in the present invention implies degrees about 0°. Further as for the restriction means 8, the range of rotation of the hinge body 52 is herein defined as 180°, but not limited to it, and the direction of rotation is not particularly limited but may be configured both as unidirectional and bidirectional, and e.g. it is possible that the hinge body rotate 180° bidirectionally. It is also allowed for the hinge body 52 to be rotatably attached to a second hinge pin 51 without a restriction means 8.

A second cam mechanism 7 keeps a hinge body 52 locked at a predetermined position of a second hinge pin 51, and it is preferable to be structured so as to keep a hinge body 52 locked at three positions, 0°, 90°, 180°, where a hinge body 52 may rotate from 0° to 180° with regard to a second hinge pin 51, i.e. a second hinge body 3 with regard to a first hinge body 2. An angle in the previous sentence is produced of a straight line along the cross direction of a first case body 2 with regard to the cross direction of a second case body 3, with an axis of a second hinge pin; in particular it is preferable for the cross direction of the former to be parallel (also substantially parallel) to the cross direction of the latter where the angle is 0°. In the meanwhile, a reference to 90° in the present invention implies degrees about 90°.

A second cam mechanism 7 is, e.g. as shown in FIGS. 2, 5, 11 and 12, composed of a second cam A 71 fixed on the outer circumference of a second hinge pin 51, a second cam B 72 attached to a hinge body 52 and contacted on the surface with a second cam A 71, second cam convex portions 73 and 74 mounted at least on either one surface of a contact surface of a second cam A 71 to be contacted on the surface with a second cam B 72, or a contact surface of a second cam B 72 to be contacted on the surface with a second cam A 71, and second cam concave portions 73 and 74 mounted at least on either one other surface of the above two surfaces and engaged with the second cam convex portions 73 and 74.

A second cam A 71 is formed in the shape of a disc. A fixing hole 71a is mounted coaxially (also substantially coaxially) of the second cam A, 71 on the central portion thereof. The fixing hole 71a has such shape that an insertion convex portion 51b on the fore end portion of a second hinge pin 51 can be fitted thereon. A second cam A 71 is fixed on the fore end portion of a second hinge pin 51 without rotating by means of the insertion convex portion 51b fitted first through the fixing hole 71a and caulked thereafter.

Four second cam convex portions 73 are mounted in a circumferential direction of a second cam A 71 on the contact surface (the surface on the side of the hinge body) thereof, each at an interval of 90° with the other. Fore end surfaces of the cam convex portions are formed as a plane. Meanwhile second cam concave portions 76 are mounted between any two of the second cam convex portions 73 the second cam concave portions 76 are aligned in a circumferential direction of a second cam A 71 on the contact surface thereof, each at an interval of 90° with the other. The border of each of the second cam convex portions 73 with each of the second cam concave portions 76 is preferably formed as an inclined surface 77.

A second cam B 72 is e.g. formed in the shape substantially of a disc, with a diameter substantially the same, and has a shape substantially of a circle having linear-shaped notches in a circumferential direction in an outer rim portion thereof. A penetration hole 72a is mounted on the second cam B 72 coaxially (also substantially coaxially) thereof. The penetration hole is mounted in a circular shape, and so large as to allow a second hinge pin 51 to be inserted therein, e.g. slightly larger than the diameter of a second hinge pin 51. Two projection portions 72b are mounted on each of two positions which are opposed to each other on an outer rim portion of the second cam B 72, and the projection portions 72b extend in an axial direction opposite to the contact surface of the second cam B 72.

The contact surface of the second cam B 72 has a shape which allows the contact surface of the second cam A 71 to be inserted therein; the contact surface of the second cam B 72 includes second cam concave portions 75 and second cam convex portions 74 to be engaged with second cam convex portions 73 and second cam concave portions 76 respectively, which both are mounted on the second cam A 71. Four second cam concave portions 75 are mounted in number of four, each at an interval of 90°. Further the second cam convex portions 74 each are aligned between each two of the second cam concave portions 75 in a circumferential direction of the second cam B 72, each at an interval of 90°. The bottom surface of the second cam concave portions 76 are formed as a plane, and accordingly the fore end portions of second cam convex portions 74 have also the shape of a plane. The border of each of the second cam concave portions 75 with each of the second cam convex portions 74 is preferably formed as an inclined surface 78.

The second cam B 72 is attached to a cam B insertion portion 521b on the top surface of a body's main body 521. A cam B insertion portion 521b is formed, as shown in FIGS. 2, 5 and 10, in a concave shape. Insertion holes 521c are mounted on the cam B insertion portion for the purpose of insertion of two projection portions 72b of the second cam B 72. This structure allows, while cam B insertion portion 521b inserted into the cam B insertion portion, the second cam B 72 to be shifted in the axial direction thereof, although the second cam B 72 cannot rotate by means of this structure: the second cam B 72 is mounted, on a hinge body 52, so as to rotate altogether with regard to a second hinge pin 51.

A cam B insertion portion 521b includes also biasing means accommodation portions 521d which are aligned e.g. at an interval of 90° in the circumferential direction thereof and which each extend in the axial direction thereof. Each of the biasing means accommodation portions 521d accommodates a second biasing means, e.g., compression coil springs 58. Compression coil springs 58, contacted with the surface opposite to the contact surface of the second cam B 72 (this surface may be called a rear surface), thus pressingly bias the second cam B 72 towards the second cam A 71. Hence the friction force working between the second cam B 72 and the second cam A 71 is increased by means of this structure, and therefore the hinge body 52 is allowed to be arrested at any position within the range of rotation of the second hinge pin 51. Further by the second cam B 72 biased using e.g. four compression coil springs 58, the body's main body i.e. the hinge body 52 will be of a decreased thickness in comparison to that in case of the second cam B 72 biased by means of a compression coil spring fitted into the outer circumference of the second hinge pin 51, thus realizing reduced costs and smaller size of the device.

The assembly of a second hinge portion 5 is described further in details as follows: first the fore end portion of a second hinge pin 51 is inserted from the side of the outer surface of a base member 53 at the bottom portion through an insertion hole 53a, and thereafter the base member 53 is attached with a use of an attaching member, such as pin and screw; at that point since a flange portion 5la of the second hinge pin 51 is pinched between the base member 53 and a first case body 2 and on the other hand a flange fitting concave portion 53c of the base member 53 are fitted together with the flange portion 51 of the second hinge pin 51, the second hinge pin 51 is attached to the first case body 2, without rotating. A hinge body 52 is attached to the second hinge pin 51 with being inserted through a penetration hole 521a of the hinge body 52 by means of washer 59; a restriction convex portion 81 is then inserted into a restriction concave portion 82 at a lower surface; due to this structure, the range of rotation of the hinge body 52 is restricted to 180°.

Second, after each of compression coil springs 58 is installed in each of biasing means accommodation portions 521d, a second cam B 72 is inserted through a penetration hole 72a from the fore end portion to the outer circumference of the second hinge pin 51; by this structure, the second cam B 72 can rotate together with the hinge body 52, being attached so as to be movable in the axial direction of the second hinge pin 51; by means of a fixing hole 71a fitted with an insertion convex portion 51b of the second hinge pin 51, the second cam A 71 is set in the outer circumference of the insertion convex portion 51b of the second hinge pin 51, with the fore end portion of an insertion convex portion 51b of the second hinge pin 51 protruding from a fixing hole 71a of the second cam A 71; with the insertion convex portion 51b caulked at the fore end portion which protrudes, the second hinge portion 5 is assembled. Therefore, the second hinge portion 5 realizes a less parts mounted, an easy mounting, and reduced costs.

Where a hinge body 52 rotates with regard to the second hinge pin 51 of the second hinge portion 5 thus assembled, a second cam convex portion 73 of a second cam A 71 escapes from a second cam concave portion 75 of a second cam B 72, and in addition a second cam convex portion 74 of the second cam B 72 also escapes from a second cam concave portion 76 of a second cam A 71, while two fore end surfaces of the second cam convex portion 73 of the second cam A 71 and of the second cam convex portion 74 of the second cam B 72 each slide, contacted on the surface with each other. If the rotation of the hinge body 52 is arrested while the above two surfaces are contacted with each other on the surface, the hinge body 52 itself is arrested at the position of contact, due to a friction force caused by a contact of the fore end surface of the second cam convex portion 73 of the second cam A 71 with that of the second cam convex portion 74 of the second cam B 72. The contact on the surface is a free stop condition, and a second rotation angle in this condition is a free stop angle.

Suppose here a state in which the second cam convex portions 73 and 74 do not escape completely from the second cam concave portions 75 and 76 where a hinge body 52 rotates with regard to the second hinge pin 51; this state is alternatively defined as any positions from the point at which fore end surfaces of the second cam convex portions 73 and 74 are contacted on the surface with, or close to, bottom surfaces of the second cam concave portions 75 and 76 (fore end surfaces of the second cam convex portions 73 and 74 are opposed at the surface to bottom surfaces of the second cam concave portions 75 and 76) to the point at which fore end surfaces of the second cam convex portions 73 and 74 are completely contacted at the surface with bottom surfaces of the second cam concave portions 75 and 76; since in this state the square portions of the second cam convex portions 73 and 74 contacted with the inclined surfaces 78 and 77, once the rotation of a hinge body 52 arrested, the second cam convex portions 73 and 74 automatically slide along the inclined surfaces until they are completely fitted with the second cam concave portions 75 and 76 to be locked. Therefore, the second cam convex portions 73 and 74 are automatically locked. The range within which the automatic locking can be realized is shown with signs A1 to A4 in FIG. 4, and a second rotation angle here is an automatic locking angle. Accordingly the automatic locking angle may be set at any desired angle by means of arbitrary change of an angle between the inclined surface 77 of the second cam A 71 and the inclined surface 78 of the second cam B 72.

A first hinge portion 4 supports a first case body 2 and a second case body 3 to be both rotatable through a first hinge pin which extends in parallel to the cross direction of a first case body 2. A first hinge portion 4 is not particularly limited only if it can support the first case body 2 and the second case body 3 to be both rotatable through a first hinge pin, but may be e.g. mounted on a hinge body 52 of a second hinge portion 5. The first hinge portion 4 is composed of a hinge case body 41 attached to a second holder 523 of the hinge body 52 of the second hinge portion 5, a first hinge pin rotatably supported by the hinge case body 41, and a first cam mechanism 6.

A hinge case body 41 is fitted into the inside of a second holder 523. The hinge case body 41 is formed in the bottomed cylindrical shape which has notched parts parallel to each other, thus being substantially elliptical at the bottom: plane portions 45 formed parallel to each other are mounted as rotation arresting means, thus fitted into the inside of a second holder 523 without rotating. A shaft insertion hole 41a is mounted at the bottom portion of the hinge case body 41 coaxially thereof. Further engagement grooves 41b are each mounted on the fore end portions of two plane portions 45 of the hinge case body 41 which extends in the axial direction thereof.

A first hinge pin 42 is inserted through the shaft insertion hole 41a of a hinge case body 41 to be rotatably supported by the hinge case body 41. A first hinge pin 42 includes at one end portion a flange portion 42a. A flange portion 42a is formed in the shape of a disc with a diameter larger than the first hinge pin 42. A first hinge pin 42 has a diameter smaller, e.g. slightly smaller than that of the shaft insertion hole 41a. The length of the first hinge pin 42 is formed to be longer than that of the hinge case body 41 in a longitudinal direction: the first hinge pin 42 is constituted so that the fore end portion thereof protrudes from a hinge case body 41, where the fore end portion (one end portion opposite to the flange portion 42a) is inserted from the side of the outer surface of the hinge case body 41 by means of a washer 46, thus making the flange portion 42a abut against the bottom position of the hinge case body 41.

Further a circumferential surface which extends from a substantially central portion to the fore end portion of the first hinge pin 42 constitutes an insertion portion 42b in the form substantially of an ellipse with notches cut off both in an axial direction thereof and to be parallel to each other and to produce each plane cross section. Moreover, a portion close to the fore end portion of the first hinge pin 42 protruding from the hinge case body 41 includes attaching holes 42c which extends in the radial direction and penetrates through two central portions on planes opposed to each other.

A first cam mechanism 6 keeps a first hinge pin 42 locked at a predetermined position of a hinge case body 41, and where, the first hinge pin 42 can rotate e.g. with regard to the hinge case body 41, i.e. a second case body can rotate with an axis of a first hinge pin 42 from 0° through 180° with regard to a first case body 2, it is preferable that the first cam mechanism 6 has a structure so as to keep the first hinge pin 42 locked at three angles, 0°, 150°, and 180°. Angles here (they may be called first rotation angles) are produced by a straight line which extends in a longitudinal direction of a first case body 2 and the other line in a longitudinal direction of a second case body 3, with an axis of the first hinge pin 42, and it is desirable that the first case body 2 is connected with second case body 3 by means of a first hinge portion 4, realizing an overlap (it may be called closing condition) of the first case body 3 with the second the case body 2 when the angle thus produced is 0°. Meanwhile, a mention to 150° in the present invention implies degrees about 150°.

A first cam mechanism 6 includes a first cam A 61 which is fixed on the outer circumference of the fore end portion of the first hinge pin 42, a double-sided cam 62 attached to the first hinge pin 42 and contacted on the surface with the first cam A 61, a first cam B 63 contacted on the surface with the double-sided cam 62, a first cam convex portion 65 mounted at least on either one surface of the contact surfaces of the first cam A 61, the double-sided cam 62 and the first cam B 63, and a first cam concave portion 66 mounted on either one surface of the contact surfaces of the first cam A 61, the double-sided cam 62 and the first cam B 63 and engaged with the first cam convex portion 65.

A first cam A 61 is formed in a shape substantially the same as that of the hinge case body 41, i.e. substantially of a disc, which has a substantially elliptic shape with notches cut off a circle in parallel. The central portions of two plane portions of the first cam A 61 includes pin insertion holes 61a which extends in the axial direction thereof and thus penetrates the both plane portions. A fixing hole 61b are mounted on the central portion of the first cam A 61 coaxially thereof. A fixing hole 61b is so formed as to accommodate an insertion portion 42b of the first hinge pin 42. The insertion portion 42b of the first hinge pin 42 is inserted into the fixing hole 61b, and then the both end portions of a pin 47 is caulked after the pin 47 inserted through a pin insertion hole 61b and an attaching hole 42c of the first hinge pin 42 adjusted at the axis, thus allowing the first cam A 61 to be fixed without rotation on the fore end portion of the first hinge pin 42. In this instance, the hinge case body 41, the first hinge pin 42 and the first cam A 61, etc, preferably have a length and shape which allow the first cam A 61 to be located close to the fore end portion of the hinge case body 41.

The circumferential surface of the first cam A 61 includes an attaching portion 15 which extends outwards in the radial direction thereof to accommodate the second case body 3. The attaching portion 15 is e.g. provided with attaching holes 15a for the purpose of attaching the second case body therein using attaching members such as screws, bolts, pins.

Two first cam convex portions 65 are mounted on the contact surface (the surface which is contacted with double-sided cam 62) of the first cam A 61. One of the first cam convex portions 65 (it may be called first cam A convex portion 65a) is mounted close to the outer circumference of the first cam A 61 in the form of a circular arc, while the other first cam convex portion 65 (it may be called first cam B convex portion 65b) substantially axis-symmetrical to the first cam convex portion 65a, is thus mounted close to the fixing hole 61b. The shapes of the first cam convex portion 65 and first cam convex portion 65b are not particularly limited, but they preferably have each of the side surfaces thereof to constitute inclined portions 67a and 67b. It is desirable that the first cam A convex portion 65 and first cam B convex portion 65b are symmetrically formed with an axis of a line perpendicular to the radial direction of the first cam A 61 in the extension of the attaching portion 15.

Figure 8:
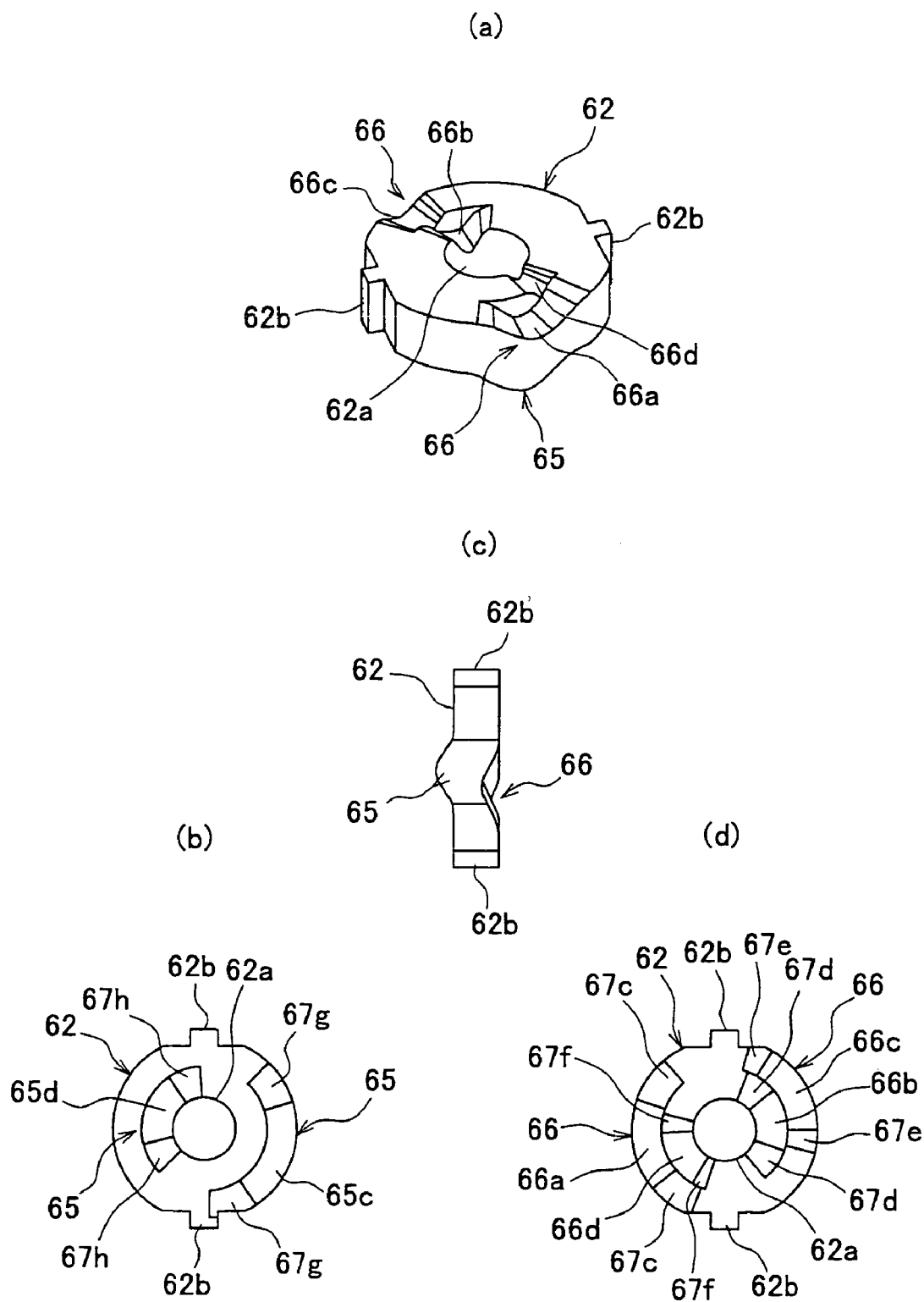
FIG. 8A to 8D are views showing an embodiment of a double-sided cam according to the present invention, FIG. 8A being a perspective view, FIG. 8B being a back view, FIG. 8C being a side view, and FIG. 8D being a plan view.
Figure 9:
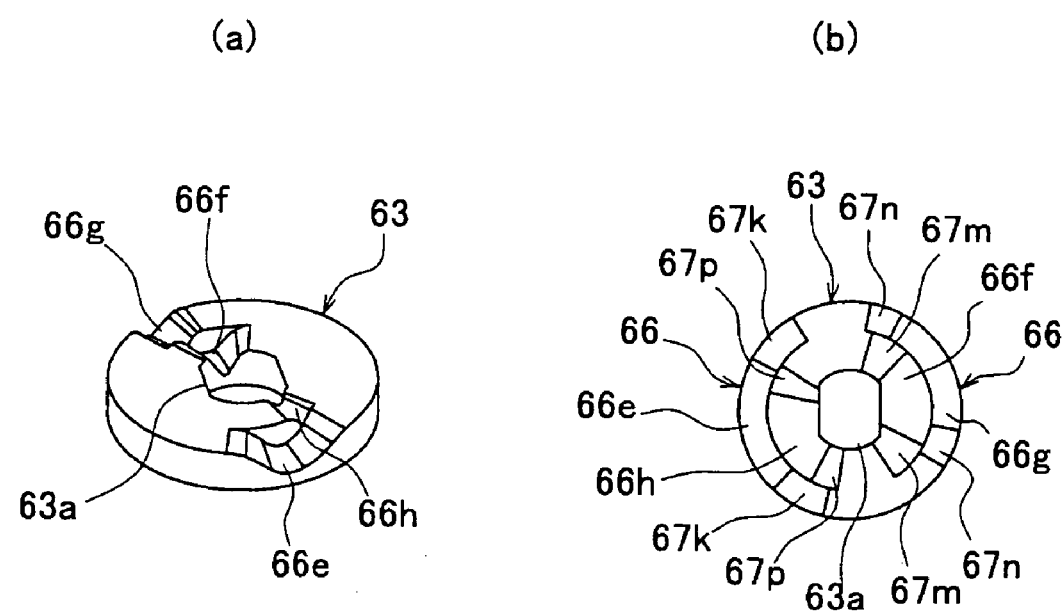
FIGS. 9A and 9B are views showing an embodiment of a first cam B according to the present invention, FIG. 9A being a perspective view and FIG. 9B being a plan view.

A double-sided cam 62 is located inside a hinge case body 41, as shown in FIGS. 2, 5, and 8. The double-sided cam 62 is formed, e.g. in the shape slightly smaller than the internal shape of the hinge case body 41, but substantially the same in the form, i.e. in the form substantially of a disc, having the external shape of a substantial ellipse which is a circle with parallel notches outside. The central portion of two plane portions of the double-sided cam 62 includes engagement protrusion portions 62*b* which extend axially and are each engaged with engagement grooves 41*b*. The double-sided cam 62 is provided with penetration holes 62*a* which lie coaxially thereof. The penetration holes 62*a* are formed in the shape of a circle so large as to allow the first hinge pin 42 to be inserted therein, and e.g. with a diameter slightly larger than that of the first hinge pin 42. The double-sided cam 62 is attached to the first hinge pin 42, with the latter inserted through the penetration holes 62*a* of the former, and the engagement grooves 41*b*, having engaged with the engagement protrusion portions 62*b* at the time of assembly, is thus altogether installed inside the hinge case body 41; accordingly this structure allows the double-sided cam 62 to be shifted in the axial direction of the first hinge pin 42, although not rotatable through the axis thereof.

A first contact surface (which is contacted with the first cam A 61) of the double-sided cam 62 is provided with first cam A concave portions and first cam B concave portions which are engaged with the first cam A convex portions 65*a* and the first cam B convex portions 65*b* respectively. Two first cam A concave portions are mounted on the first contact surface of the double-sided cam 62, and also two first cam B concave portions are provided on the same surface.

Either one of two first cam A concave portions (it may be called first cam A concave portion 66*a*) and either one of two first cam B concave portions (it may be called first cam B concave portion 66*b*) are both formed in the shape of a circular arc at a position in which they are engaged with the first cam A convex portion 65*a* and the first cam B convex portion 65*b* where the first rotation angle is 0°. The shape of the first cam A concave portions 66*a* and the first cam B concave portions 66*b* is not particularly limited to that of a circular arc only if they can be engaged with the first cam A convex portions 65*a* and the first cam B convex portions 65*b* respectively, but a structure is also possible where the first cam A concave portions 66*a* and the first cam B concave portions 66*b* are formed symmetrically with an axis of a line which extends in a direction perpendicular (it may be called first orthogonal direction) to the radial direction of the double-sided cam 62, in the extension of the engagement protrusion portions 62*b*; in this embodiment however, the first cam A concave portions 66*a* and the first cam B concave portions 66*b* are preferably formed at the predetermined angle with regard to the first orthogonal direction, e.g. at 10° thereto in an opposite direction from that of the first rotation angle. It is desirable that the side surfaces of the first cam A concave portions 66*a* constitute inclined surfaces 67*c*, and for the first cam B concave portions 66*b*, the side surfaces are recommended to be formed as inclined surfaces 67*d*. In the meanwhile, a reference to 10° in the present invention implies also degrees about 10°.

The other one of two first cam A concave portions (it may be called first cam A2 concave portion 66*c*) and the other one of two first cam B concave portions (it may be called first cam B2 concave portion 66*d*) are both formed in the shape of a circular arc at a position in which they are engaged with the first cam A convex portion 65*a* and the first cam B convex portion 65*b* where the first rotation angle is 150°. The shape of the first cam A2 concave portions 66*c* and the first cam B2 concave portions 66*d* is not particularly limited to that of a circular arc only if they can be engaged with the first cam A convex portions 65*a* and the first cam B convex portions 65*b* respectively, and the first cam A2 concave portions 66*c* and the first cam B2 concave portions 66*d* are preferably formed at 150° with regard to the first orthogonal direction. It is desirable that the side surfaces of the first cam A2 concave portions 66*c* constitute inclined surfaces 67*e*, and for the first cam B2 concave portions 66*d*, the side surfaces are recommended to be formed as inclined surfaces 67*f*. Moreover, the first contact surface without the first cam A concave portions 66*a*, the first cam B concave portions 66*b*, the first cam A2 concave portions 66*c* and the first cam B2 concave portions 66*d* is preferably formed as a plane.

A second contact surface (which is opposite to the first contact surface) of the double-sided cam 62 is provided with two first cam convex portions 65. One of the first cam C convex portions 65*c* (it may be called first cam C convex portions 65*c*) is mounted close to the outer circumference of the double-sided cam 62, while the other first cam convex portion 65 (it may be called first cam D convex portions 65*d*), substantially in an axis-symmetrical position, close to the penetration holes 62*a*, both having the shape of circular arc. The shape of the first cam C convex portion 65*c* and the first cam D convex portion 65*d* is not particularly limited to that of a circular arc, however, each side surface thereof is recommended to be formed as inclined surfaces 67*g* and 67*h*, respectively. It is desirable that the first cam C convex portion 65*c* and the first cam D convex portion 65*d* are formed symmetrically with an axis of a line which extends in a direction at 20° from the first orthogonal direction. In the meanwhile, a reference to 0° in the present invention implies degrees about 20°. Furthermore, the double-sided cam 62 is described in the embodiment of the present invention as being mounted on the first cam mechanism 6, the location thereof however is not limited to the embodiment of the present invention; it is possible that the double-sided cam 62 is mounted also on a second cam mechanism 7, or otherwise exclusively on the second cam mechanism 7.

A first cam B 63 is installed inside a hinge case body 41 so as to be rotatable through the axis thereof, and formed, e.g. in the shape of a disc with a diameter slightly smaller than the smallest distance of inner walls of the hinge case body 41. The first cam B 63 includes penetration holes 63*a* coaxially (also substantially coaxially) thereof. The penetration holes 63*a* are formed substantially in the form of ellipse, and herein an insertion portion 42*b* of a first hinge pin 42 may penetrate. The first cam B 63 accommodates at penetration holes 63*a* thereof an insertion portion 42*b* of a first hinge pin 42 to be fitted through therein, and at the assembly, installed inside the hinge case body 41, located on the side of a flange portion 42*a* of the double-sided cam 62; thus the first cam B 63 is constituted to be shifted in the axial direction of the first hinge pin 42 and rotatable along with the first hinge pin 42.

A contact surface (which is contacted with the double-sided cam 62) of the first cam B 63 is provided with first cam A concave portions and the first cam B concave portions, each engaged with the first cam C convex portion 65*c* and the first cam D convex portion 65*d*. Two first cam A concave portions and two first cam B concave portions respectively are mounted on the contact surface. Either one of the first cam A concave portions (it may be called first cam A3 concave portion 66*e*) and either one of the first cam B concave portions (it may be called first cam B3 concave portion 66*f*) respectively, are formed in the shape of a circular arc at a position in which they are engaged with the first cam C convex portion 65*c* and the first cam D convex portion 65*d* where the first rotation angle is 0°. The shape of the first cam A3 concave portion 66*e* and the first cam B3 concave portion 66*f* is not particularly limited to that of a circular arc if the engagement with the first cam C convex portion 65*c* and the first cam D convex portion 65*d* is possible, however, it is desirable to be formed symmetrically with an axis of a line at a predetermined angle e.g. at 10° in the first rotation angle of a direction perpendicular (it may be called second orthogonal direction) to the longitudinal direction of the insertion portion 42*b*, e.g. at 10° in the first rotation angle. For each of the first cam A3 convex portion 66*e* and the first cam B3 convex portion 66*f*, side surfaces are recommended to be formed as inclined surfaces 67*k* and 67*m*.

The other first cam A concave portion (it may be called first cam A4 concave portion 66*g*) and the other first cam B concave portion (it may be called first cam B4 concave portion 66*h*) are set at a position in which each of them are engaged with the first cam C convex portion 65*c* and the first cam D convex portion 65*d* respectively, where the first rotation angle is 180°. The configuration of the first cam A4 concave portion 66*g* and the first cam B4 concave portion 66*h* is not particularly limited, if the engagement with the first cam C convex portion 65*c* and the first cam D convex portion 65*d* is possible; it is recommended to be formed symmetrically with an axis of a line at a predetermined angle e.g. at 205° in the first rotation angle from the second orthogonal direction. In the meanwhile, a reference to 205° in the present invention implies degrees about 205°. For each of the first cam C convex portion 65*c* and the first cam D convex portion 65*d*, each side surface is recommended to be formed as inclined surfaces 67*n* and 67*p*. Furthermore, contact surfaces except those with the first cam A3 concave portion 66*e*, the first cam B3 concave portion 66*f*, the first cam A4 concave portion 66*g* and the first cam B4 concave portion 66*h* are recommended to be formed as plane surfaces. Further contact surfaces opposite to those with the above first cam concave portions (they may be called biasing surfaces) are desirable to be plane on the first cam B 63. A biasing means is recommended to be mounted between the biasing surfaces and the inner surface of the hinge case body 41 at the bottom thereof, and in the outer circumference of the first hinge pin.

As a biasing means, e.g. a compression coil spring 68 may be used. The compression coil spring 68 is e.g. fitted in the outer circumference of the first hinge pin 42, with one end portion contacted by means of a washer 48 with the inner surface of the hinge case body 41 at the bottom thereof, and the other surface by means of washer 49 with a biasing surface of the first cam B 63; the compression coil spring 68 thus presses the first cam B 63 towards a double-sided cam 62 with regard to the hinge case body 41, and further biases the first cam B 63 towards a double-sided cam 62 by means of the pressure. Hence friction force working between the first cam B 63 and the double-sided cam 62, and one between the double-sided cam 62 and the first cam A 61 both become increased and this allows the first hinge pin 42 to be arrested at any position within the range of rotation of the hinge case body 41.

In other words, the assembly of the first hinge portion 4 may be described as follows: a fore end portion of the first hinge pin 42 is inserted by means of washer 46 from the outer surface at the bottom of the hinge case body 41 through a shaft insertion hole 41*a*, then a washer 48, a compression coil spring 68 and a washer 49 are sequentially fitted; after the parts fitted, an insertion portion 42*b* of a first hinge pin 42 has been fitted in the first cam B 63 and thus attached thereto is installed inside the case body 41; thereafter, a double-sided cam 62 which has been attached to an insertion portion 42*b*, and has an engagement concave portion 62*b* of the double-sided cam 62 engaged with an engagement groove 41*b* of the hinge case body, is installed inside the hinge case body 41.

Thereupon, the insertion portion 42*b* is fitted into a fixing hole 42*b*, and the first cam A 61 is set in the outer circumference of the insertion portion 42*b*; a pin insertion hole 61*a* is adjusted at the axis with an attaching hole 42*c*; while at this stage the first cam B 63 contacted on one hand with the double-sided cam 62 to be contacted in its turn with the first cam B63, the latter is biased due to the biasing force of a compression coil spring; the first cam B63 pressed towards the double-sided cam 62, resisting the biasing force; on the first cam B63 an insertion hole 61*a* is adjusted at the axis with an attaching hole 42*c*. A pin 47 is inserted through the insertion hole and the attaching hole 42*c* just adjusted as described above, and thereafter, two end portions of the pin 47 are caulked. This is the assembly of the first hinge portion 4. Accordingly the first hinge portion 4 is to realize parts in smaller number, an easy assembly, and reduced costs.

Based on the assembly as described above, where the first hinge pin 42 rotates with regard to the hinge case body 41, the first cam convex portion 65 escapes from the first cam concave portion 66, slides both on the plane surface of the double-sided cam 62 and the plane surface of the first cam B 63; if in this condition the rotation of the first hinge pin 42 is arrested, the first hinge pin 42 itself is arrested at the position due to the friction force caused by the contact thereof both with the plane surface of the double-sided cam 62 and the plane surface of the first cam B 63. This condition is a free stop condition and the first rotation angle in this condition is a free stop angle.

Suppose here a condition in which the first cam convex portion 65 does not completely escape from the first cam concave portion 66, i.e. when the square portion of the first cam convex portion 65 is contacted with the inclined surface of the first cam concave portion 66 where the first hinge pin 42 rotates with regard to the hinge case body 41; if in this condition the rotation of a hinge body 52 is arrested, the first cam convex portion 65 is shifted automatically along the inclined surface 67 and the rotation thereof is arrested, which leads to a locking condition: in other words, the hinge body 52 is automatically locked. This range within which the hinge body 52 is automatically locked is illustrated with signs B1 to B4 in FIG. 3, the first rotation angle within this range is an automatic locking angle. Accordingly, if the angle of an incline surface 67 of the first cam concave portion 66 is arbitrarily changed, an automatic locking angle is set at any desired angle.

Hereinafter functions of a hinge device of portable equipment and a portable telephone according to the present invention are illustrated.

While a portable telephone 10 is out of use, a first case body 2 and a second case body 3 are two-folded to overlap each other, as shown in FIGS. 1B and 1C, and FIG. 2. In this condition at 0° in the first rotation angle, and the first cam convex portion 66; on the other hand, and at 0° in the second rotation angle, the second cam convex portions 73 and 74 are engaged and locked with the first cam concave portions 75 and 76; therefore a closing condition is maintained, where a first case body 2 overlaps a second case body 3.

At that point, the first case body 2 and the second case body 3 are kept twofold, overlapping each other; in this engagement the first cam convex portion 65 is engaged to be locked with the first cam concave portion 66, thus a closing position is maintained, and herein the first case body 2 overlaps the second case body 3 without shaking.

In other words, where the first rotation angle is 0°, a first cam A convex portion 65*a* and a first cam B convex portion 65b are to be engaged respectively with a first cam A concave portion 66a and a first cam B concave portion 66b, however, the first cam A convex portion 65a and the first cam B convex portion 65b are symmetrical with an axis of a line at 0° in the first rotation angle, although the first cam A concave portion 66a and the first cam B concave portion 66b are symmetrical with an axis of a line at −10° in the first rotation angle, and not at 0° in the first rotation angle: the deviation between the axis for the first cam A convex portion 65a and the first cam B convex portion 65b and that for the first cam A concave portion 66a and the first cam B concave portion 66b turns out 10°. The side surfaces of the first cam A concave portion 66a and the first cam B concave portion 66b are formed as inclined surfaces 67c and 67d respectively. Therefore, portions of the first cam A convex portion 65a and the first cam B convex portion 65b intrude into the first cam A concave portion 66a and the first cam B concave portion 66b.

In the meanwhile, where the first rotation angle is 0°, a first cam C convex portions 65c and a first cam D convex portions 65d are engaged with a first cam A3 concave portion 66e and a first cam B3 concave portion 66f, further the first cam C convex portions 65c and the first cam D convex portions 65d are symmetrical relative to the axis of a line at 0° in the first rotation angle, although the first cam A3 concave portion 66e and the first cam B3 concave portion 66f are symmetrical with an axis of a line at 10° in the first rotation angle, and not at 0° in the first rotation angle: the deviation between the axis for the first cam C convex portion 65c and the first cam D convex portions 65d and that for the first cam A3 concave portion 66e and the first cam B3 concave portion 66f turns out 10°. The side surfaces of the first cam A3 concave portion 66e and the first cam B3 concave portion 66f are formed as inclined surfaces 67k and 67m respectively. Therefore, portions of first cam C convex portion 65c and the first cam D convex portion 65d intrude into the first cam A3 concave portion 66e and the first cam B3 concave portion 66f.

As described above, a first cam A convex portion 65a and a first cam B convex portion 65b are engaged with a first cam A concave portion 66a and a first cam B concave portion 66b without being completely (also substantially completely) fitted with the latter, and further the situation is the same for a first cam C convex portions 65c and a first cam D convex portions 65d with regard to a first cam A3 concave portion 66e and a first cam B3 concave portion 66f; therefore, where the first rotation angle is 0°, a second case body 3 is biased towards a first case body 2 to be contacted therewith, for being completely (also substantially completely) fitted, and thus the second case body 3 and the first case body 2 are maintained in a closing condition without shaking.

For the purpose of making a call on the portable telephone as described above, the user rotates the second case body 3 in an opening direction (in which the second case body 3 is disengaged from the first case body, with an axis of the first hinge pin), with his left hand grasping the first case body 2 and right hand on the second case body 3: he rotates the first hinge pin 42 rotates with regard to the hinge case body 41. Accordingly each of the first cam convex portions 65, having escaped from the first cam concave portions 66 (i.e. is released from an engagement therewith), slides on a plane surface of a double-sided cam 62 and a plane surface of a first cam B 63. Thereafter, where the first rotation angle is 150°, a first cam A convex portion 65a and a first cam B convex portion 65b intrudes into a first cam A2 concave portion 66c and a first cam B2 concave portion 66d respectively, to be engaged therewith and locked therein: the second case body is opened to be available to call. Therefore, the user can make a call on the telephone.

Furthermore, where the second case body 3 rotates until 180° in the first rotation angle, the rotation thereof is arrested; in this condition, after the first cam A convex portion 65a and the first cam B convex portion 65b escape from the first cam A2 concave portion 66c and the first cam B2 concave portion 66d (i.e. are released from an engagement therewith), a first cam C convex portion 65c and a first cam D convex portion 65d intrudes into a first cam A4 concave portion 66g and a first cam B4 concave portion 66h to be engaged therewith and locked therein, The condition where the second case body 3 is opened at 180° with regard to the first case body 2 is maintained.

In this condition, i.e. where the first rotation angle is 0°, a first cam C convex portion 65c and a first cam D convex portion 65d are engaged with the first cam A4 concave portion 66g and the first cam B4 concave portion 66h; in this situation, the first cam C convex portion 65c and the first cam D convex portion 65d are symmetrical with an axis of a line at 200° in the first rotation angle, although the first cam A4 concave portion 66g and the first cam B4 concave portion 66h are symmetrical with an axis of a line at 205° in the first rotation angle: the deviation between the axis for the first cam C convex portion 65c and the first cam D convex portion 65d and that for the first cam A4 concave portion 66g and the first cam B4 concave portion 66h turns out 5°. In the meanwhile, the side surfaces of the first cam A4 concave portion 66g and the first cam B4 concave portion 66h are formed as inclined surfaces 67n and 67p respectively. Therefore, portions of the first cam C convex portion 65c and the first cam D convex portion 65d intrude into the first cam A4 concave portion 66g and the first cam B4 concave portion 66h.

As described above, a first cam C convex portion 65c and a first cam D convex portion 65d are engaged with a first cam A4 concave portion 66g and a first cam B4 concave portion 66h without being completely (also substantially completely) fitted therewith; therefore, where the first rotation angle is 180°, a second case body 3 is biased towards a first case body 2 to be contacted therewith, for being completely fitted in a direction where the angle of the second case body 3 with regard to the first is greater than 180°, and thus the second case body 3 and the first case body 2 are maintained in a opening condition without shaking.

If the user desires to place the second case body back to the original position, he rotates the second case body 3 in an closing direction which is opposite to the opening direction (in which the second case body 3 approaches to the first case body), with an axis of the first hinge pin, with his left hand grasping the first case body and right hand on the second case body 3. Accordingly each of the first cam convex portions 65 is released from an engagement with each of the first cam concave portions 66 respectively, and the former slides on a plane surface of a double-sided cam 62 and a plane surface of a first cam B 63. Thereafter, where the first rotation angle of the first hinge pin is 0° from the point at which the first cam convex portions 65, after being released from an engagement with the first cam concave portions 66, slide on a place surface of each of the double-sided cam 62 and first cam B 63, first cam convex portions 65 intrude into first cam concave portion respectively, to be engaged therewith and locked therein: hence the closing condition is realized and the original condition is retrieved.

Where the first case body 2 rotates with regard to the second case body 3 and the rotation is arrested, if the first rotation angle or the second rotation angle is the free stop angle, the second case body 3 can be arrested at the angle. In other words, each of the first cam convex portions 65 escapes from each of the first cam concave portion respectively to slide on a plane surface of a double-sided cam 62 and a plane surface of a first cam B 63. At that point, if the rotation of the second case body 3 is arrested, the second case body 3 is arrested at the position of contact, due to a friction force caused by a contact of the first cam concave portion with double-sided cam 62, and by that of the first cam concave portion with first cam B 63.

Where the user desires to use communication lines as internet, he can rotate the second case body 3 in an opening direction e.g. until 180°. In doing so, he can maintain the position of the first case body 2 and the second case body 3 not to shake, as is defined above. In this case, if he has an intention to use the above-described portable equipment, having a display portion 3a inclined to the position at 90° with regard to a key board portion 2a, he can rotate the second case body 3 around the second hinge pin 51 to any set angle within the range of angle e.g. until 180° to the left, since the second rotation angle is 0° and a gap 11 is provided between the first case body 2 and the second case body 3. Further if the second rotation angle is e.g. 90° and 180°, second cam convex portions 73 and 74 escape from second cam concave portions 75 and 76 respectively (are released from an engagement therewith), while the fore end portion of the former sliding on the fore end surfaces of the second cam concave portions 75 and 76. Moreover, if the rotation of the second case body is arrested while the second cam convex portions 73 and 74 contacted with the fore end surfaces of the second cam concave portions 75 and 76, and thus sliding thereon, the second case body 3 is arrested at the position of contact, due to a friction force caused by a contact of the second cam concave portions 73 and 74 with the fore end surfaces of the second cam concave portions 75 and 76: if the second rotation angle is a free stop angle, the second case body is arrested at the angle. Accordingly in the case of use for communication lines as internet, the second case body is arrested with regard to the first case body at more positions than the prior devices, thus realizing an improved use of communication lines as internet.

Accordingly a hinge device 1 of portable equipment and portable telephone 10 according to the present invention enable a combination of decreased parts, an easy assembly, and reduced costs, while allowing furthermore more complex operation and characteristics. Consequently, in making a call on the telephone and using communication lines as internet, the user can keep the first case body locked relative to the second; thus a better telephone call and a better use of communication lines as internet becomes possible.

Moreover, a first cam mechanism 6 is constituted using three members, a first cam A 61, double-sided cam 62, and a first cam B 63 to keep a first hinge pin 42 locked at three positions, i.e. 0°, 150° and 180° in the first rotation angle; therefore, the abrasion of parts is decreased and resistance is improved in comparison to embodiments by means of two members. Further the first cam mechanism 6, being constituted using three members, i.e. a first cam 61, double-sided cam 62, and a first cam B 63, realizes, in comparison to embodiments with two members, an increased friction force caused by the contact of a first cam convex portion 65 with a double-sided cam 62 and with a first cam B 63, allowing the second case body to be arrested at any position.

As illustrated above, a hinge device of portable equipment and portable telephone according to the present invention enables the second case body to be locked at a position with regard to the first, thus allowing a better phone call and a better use of communication lines as internet; therefore the hinge device is suitable for portable equipment, and among all, portable telephones.

What is claimed is:

1. A hinge device of a portable equipment comprising:
a first hinge portion including a first hinge pin and coupling a first case body and a second case body constituting the portable equipment to each other so as to allow the second case body to rotate relative to the first case body with respect to the first hinge pin;
a second hinge portion including a second hinge pin which extends in a direction perpendicular to the first hinge pin and coupling the first case body and the second case body to each other so as to allow the second case body to rotate relative to the first case body with respect the second hinge pin,
wherein said second hinge portion comprises: the second hinge pin standing vertically on the first case body; a hinge body provided to be rotatable around an axis of the second hinge pin; a second cam A fixed to a fore end portion of the second hinge pin; a second cam B rotating together with the hinge body as well as being movable in an axial direction of the second hinge pin, and being in surface contact with the second cam A; a second biasing means, provided between the second cam B and the hinge body, for biasing the second cam B toward the second cam A; a second cam convex portion provided on at least one of a contact surface of the second cam A and a contact surface of the second cam B; and a second cam concave portion provided on at least the other of the contact surface of the second cam A and the contact surface of the second cam B and engaged with the second cam convex portion to keep a position of the second case body relative to the first case body at a predetermined position in a locked state,
wherein said first hinge portion comprises: a hinge case body fixed to the hinge body; the first hinge pin rotatably supported by the hinge case body; a first cam A fixed to the first hinge pin and having a mounting part to which the second case body is attached; a double-sided cam engaged with the hinge case body as well as being movable in an axial direction of the first hinge pin, and being in surface contact with the first cam A; a first cam B rotating together with the first hinge pin as well as being movable in the axial direction of the first hinge pin, and being in surface contact with the double-sided cam; a first biasing means, provided between the first cam B and the hinge case body, for biasing the first cam B toward the double-sided cam to thereby press the double-sided cam against the first cam A; first cam convex portions provided on at least one of a contact surface of the first cam A and a first contact surface of the double-sided cam being in contact with the first cam A and on at least one of a second contact surface of the double-sided cam being in contact with the first cam B and a contact surface of the first cam B; and first cam concave portions provided on at least the other of the contact surface of the first cam A and the first contact surface of the double-sided cam and on at least the other of the second contact surface of the double-sided cam and the contact surface of the first cam B, and engaged with the first cam convex portions to keep a position of the second case body relative to the first case body at a predetermined position in a locked state.

2. The hinge device of the portable equipment according to claim 1, wherein the second cam convex portions are arranged on at least one of the contact surface of the second cam A and the contact surface of the second cam B at 90° intervals in a circumferential direction thereof, and the second cam concave portions are arranged on at least the other of the contact surface of the second cam A and the contact surface of the second cam B at 90° intervals in the circumferential direction thereof.

3. The hinge device of the portable equipment according to claim 1, wherein the second cam A and the second cam B are formed in a disk shape, and the second biasing means is constituted of two springs or more arranged in a circumferential direction of the second cam B.

4. The hinge device of the portable equipment according to claim 1, wherein said second hinge portion includes a restricting means for restricting a rotation range of the hinge body relative to the second hinge pin.

5. The hinge device of the portable equipment according to claim 1, wherein the single first cam convex portion is provided on the contact surface of the first cam A, the two first cam concave portions engaged with the first cam convex portion are provided on the first contact surface of the double-sided cam, and the first cam convex portion and the first cam concave portions are engaged with each other when the first case body and the second case body are in a closed state where the first case body and the second case body are put one on the other and a first rotation angle of the second case body relative to the first case body is 0°, as well as being engaged with each other when the second case body in the closed state is rotated relative to the first case body with respect to the first hinge pin up to the first rotation angle of 150°, and wherein the single cam convex portion is provided on the second contact surface of the double-sided cam, the two first cam convex portions engaged with the first cam convex portion are provided on the contact surface of the first cam B, and the first cam convex portion and the first cam concave portions are engaged with each other when the first case body and the second case body are in the closed state where the first case body and the second case body are put one on the other and the first rotation angle of the second case body relative to the first case body is 0°, as well as being engaged with each other when the second case body in the closed state is rotated relative to the first case body with respect to the first hinge pin up to the first rotation angle of 180°.

6. The hinge device of a portable equipment according to claim 1, which is mounted between said first case body and said second case body.

* * * * *